United States Patent
Xu et al.

(10) Patent No.: US 11,012,178 B2
(45) Date of Patent: May 18, 2021

(54) DOWNLINK INFORMATION TRANSMISSION METHOD, BASE STATION, AND USER EQUIPMENT

(71) Applicant: HUAWEI TECHNOLOGIES CO., LTD., Guangdong (CN)

(72) Inventors: Xiaoying Xu, Shanghai (CN); Xiaoxiao Zheng, Shanghai (CN); Qufang Huang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/821,201

(22) Filed: Nov. 22, 2017

(65) Prior Publication Data

US 2018/0109350 A1    Apr. 19, 2018

Related U.S. Application Data

(63) Continuation of application No. PCT/CN2015/079964, filed on May 27, 2015.

(51) Int. Cl.
*H04W 72/12* (2009.01)
*H04W 72/04* (2009.01)
(Continued)

(52) U.S. Cl.
CPC .......... *H04L 1/0004* (2013.01); *H04L 5/0048* (2013.01); *H04W 28/00* (2013.01);
(Continued)

(58) Field of Classification Search
CPC ..... H04L 1/0004; H04L 5/0048; H04L 5/001; H04L 27/2601; H04W 72/042;
(Continued)

(56) References Cited

U.S. PATENT DOCUMENTS

2011/0092231 A1*  4/2011  Yoo .................. H04B 1/7097
                                                            455/501
2012/0058791 A1    3/2012  Bhattad et al.
(Continued)

FOREIGN PATENT DOCUMENTS

CN      102196495        9/2011
CN      102638294        8/2012
(Continued)

OTHER PUBLICATIONS

International Search Report, dated Feb. 4, 2016, in International Application No. PCT/CN2015/079964 (6 pp.).
(Continued)

*Primary Examiner* — Moo Jeong
(74) *Attorney, Agent, or Firm* — Leydig, Voit & Mayer, Ltd.

(57) ABSTRACT

Embodiments of the present invention provide a downlink information transmission method, a base station, and user equipment. The method includes: sending, by a first base station, downlink information by using a first period according to a first pattern; sending, by the first base station, the downlink information by using a second period according to the first pattern, or by using the first period according to a second pattern, or by using a second period according to a second pattern when the first base station determines to change a transmission period and/or a transmission pattern of the downlink information, where the second period is less than the first period, and OFDM symbols occupied by the second pattern are more than OFDM symbols occupied by the first pattern. The present invention is applicable to the field of communications technologies.

3 Claims, 15 Drawing Sheets

(51) Int. Cl.
    *H04W 56/00*     (2009.01)
    *H04W 28/00*     (2009.01)
    *H04L 5/00*     (2006.01)
    *H04L 27/26*     (2006.01)
    *H04L 1/00*     (2006.01)

(52) U.S. Cl.
    CPC ..... *H04W 56/003* (2013.01); *H04W 56/0045* (2013.01); *H04W 72/042* (2013.01); *H04W 72/1205* (2013.01); *H04L 5/001* (2013.01)

(58) Field of Classification Search
    CPC ........... H04W 56/0045; H04W 56/003; H04W 72/1205; H04W 28/00; H04W 72/1273; H04W 72/1289
    See application file for complete search history.

(56) References Cited

U.S. PATENT DOCUMENTS

| | | |
|---|---|---|
| 2014/0226509 A1 | 8/2014 | Ko et al. |
| 2014/0247749 A1 | 9/2014 | Kim et al. |
| 2014/0321375 A1 | 10/2014 | Agiwal et al. |
| 2015/0043520 A1 | 2/2015 | Sun et al. |
| 2015/0257173 A1 | 9/2015 | You et al. |
| 2015/0289268 A1 | 10/2015 | Ohta et al. |
| 2016/0218816 A1* | 7/2016 | Horiuchi ............. H04L 5/005 |
| 2017/0257139 A1* | 9/2017 | Axnas ............. H04L 5/0012 |

FOREIGN PATENT DOCUMENTS

| | | |
|---|---|---|
| CN | 102868421 | 1/2013 |
| CN | 103427968 | 12/2013 |
| EP | 2154802 | 2/2010 |
| EP | 2717639 | 4/2014 |
| EP | 2540022 | 5/2016 |
| JP | 2016507962 A | 3/2016 |
| JP | 2017561644 | 8/2019 |
| WO | WO2012118328 | 9/2012 |
| WO | 2014056643 A1 | 4/2014 |
| WO | 2014097357 A1 | 6/2014 |
| WO | 2014109566 A1 | 7/2014 |

OTHER PUBLICATIONS

3GPP TS 36.331 V12.5.0 (Mar. 2015), 3rd *Generation Partnership Project; Technical Specification Group Radio Access Network; Evolved Universal Terrestrial Radio Access (E-UTRA); Radio Resource Control (RRC); Protocol specification (Release 12)*, pp. 1-445.

International Search Report, dated Feb. 4, 2016, in International Application No. PCT/CN2015/079964 (8 pp.).

Notice of Reasons for Rejection, dated Nov. 19, 2018, in Japanese Application No. 2017-561644 (4 pp.).

Extended European Search Report, dated Apr. 12, 2018, in European Application No. 15892930.7 (8 pp.).

* cited by examiner

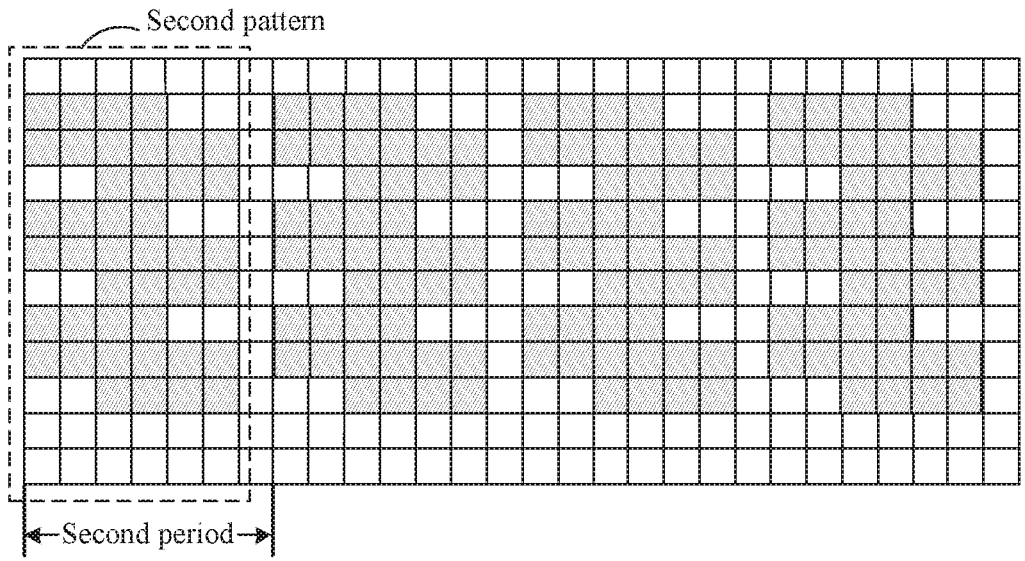

FIG. 2(d)

| A first base station sends downlink information by using a first period according to a first pattern | — S101 |

| The first base station sends the downlink information by using a second period according to the first pattern, or by using the first period according to a second pattern, or by using the second period according to the second pattern when the first base station determines to change a transmission period and/or a transmission pattern of the downlink information | — S102 |

| After the UE accesses the first base station, the first base station sends the downlink information at a preset time point based on the first period according to the first pattern. | — S103a |

FIG. 3(a)

DOWNLINK INFORMATION TRANSMISSION METHOD, BASE STATION, AND USER EQUIPMENT

CROSS-REFERENCE TO RELATED APPLICATIONS

This application is a continuation of International Application No. PCT/CN2015/079964, filed on May 27, 2015, the disclosure of which is hereby incorporated by reference in its entirety.

TECHNICAL FIELD

The present invention relates to the field of communications technologies, and in particular, to a downlink information transmission method, a base station, and user equipment.

BACKGROUND

As the pace of people's life accelerates, people have higher requirements on quality of a mobile service.

In the prior art, in order that user equipment (UE) entering coverage of a base station can rapidly establish a wireless connection to the base station, the base station may send downlink information periodically in a fixed sending manner, such as a synchronization signal, a discovery signal, or a system broadcast message. For example, in a Long Term Evolution (LTE) system, the base station needs to send synchronization information every 5 ms, send a measurement signal every 1 ms, and send a system broadcast message every 10 ms. On one hand, periodic sending of downlink information may occupy a considerable part of downlink resources. In this way, downlink resources used for data transmission are reduced, leading to low utilization of the downlink resources. On the other hand, although it can be ensured to some extent that the UE can establish a wireless connection to the base station in time when the base station sends the downlink information periodically in a fixed sending manner, a requirement of a user for rapid access to a network still cannot be satisfied.

In conclusion, an existing downlink information sending method cannot satisfy user requirements, and overheads are relatively large.

SUMMARY

In view of this, embodiments of the present invention provide a downlink information transmission method, a base station, and user equipment, to resolve at least a prior-art problem that a requirement of a user for rapid access to a network cannot be satisfied, so that it can be ensured that UE can obtain downlink information in time and can establish a wireless connection to a base station rapidly, thereby reducing a time for the UE to access a network, and improving user experience.

To achieve the foregoing objective, the following technical solutions are used in the embodiments of the present invention use.

According to a first aspect, a downlink information transmission method is provided, where the method includes: sending, by a first base station, downlink information by using a first period according to a first pattern; and sending, by the first base station, the downlink information by using a second period according to the first pattern, or by using the first period according to a second pattern, or by using a second period according to a second pattern when the first base station determines to change a transmission period and/or a transmission pattern of the downlink information, where the second period is less than the first period, and orthogonal frequency division multiplexing (OFDM) symbols occupied by the second pattern are more than OFDM symbols occupied by the first pattern.

With reference to the first aspect, in a first possible implementation of the first aspect, that the first base station determines to change a transmission period and/or a transmission pattern of the downlink information includes: after the first base station determines that a preset condition is satisfied, determining, by the first base station, to change the transmission period and/or the transmission pattern of the downlink information, where the preset condition includes that the first base station detects that a measurement value of an uplink pilot sent by user equipment (UE) is greater than a specified value, or that the first base station receives a proximity instruction message, an access sequence, or a scheduling request signal sent by the UE, or that the first base station receives a first instruction message sent by a second base station, where the first instruction message is used to instruct the first base station to change the transmission period and/or the transmission pattern of the downlink information.

With reference to the first possible implementation of the first aspect, in a second possible implementation of the first aspect, after the sending, by the first base station, the downlink information, the method further includes: after the UE accesses the first base station, sending, by the first base station, the downlink information at a preset time point by using the first period according to the first pattern; or sending, by the first base station, the downlink information by using the first period according to the first pattern after a preset time.

With reference to the first possible implementation of the first aspect or the second possible implementation of the first aspect, in a third possible implementation of the first aspect, when the preset condition is that the first base station receives the first instruction message sent by the second base station, after the sending, by the first base station, the downlink information, the method further includes: sending, by the first base station, an identifier of the second period and/or an identifier of the second pattern to the second base station; or receiving, by the first base station, a request message sent by the second base station, where the request message is used to request to obtain an identifier of the second period and/or an identifier of the second pattern; and sending, by the first base station, a request response message to the second base station, where the request response message carries the identifier of the second period and/or the identifier of the second pattern.

With reference to the first possible implementation of the first aspect or the second possible implementation of the first aspect, in a fourth possible implementation of the first aspect, when the preset condition is that the first base station detects that the measurement value of the uplink pilot sent by the user equipment (UE) is greater than the specified value, or that the first base station receives the proximity instruction message, the access sequence, or the scheduling request signal sent by the UE, after the sending, by the first base station, the downlink information, the method further includes: sending, by the first base station, a second instruction message to the UE, where the second instruction message is used to indicate that the period and/or the pattern used by the first base station to send the downlink information have been changed.

With reference to the fourth possible implementation of the first aspect, in a fifth possible implementation of the first aspect, the second instruction message carries an identifier of the second period and/or an identifier of the second pattern.

With reference to the fourth possible implementation of the first aspect or the sixth possible implementation of the first aspect, in a sixth possible implementation of the first aspect, after the sending, by the first base station, the downlink information, the method further includes: sending, by the first base station, the second instruction message to at least one first UE covered by the first base station.

With reference to any one of the first aspect to the sixth possible implementation of the first aspect, in a seventh possible implementation of the first aspect, the downlink information includes a downlink common signal and/or a part or all of downlink common information.

According to a second aspect, a first base station is provided, where the first base station includes a sending unit and a determining unit, where the sending unit is configured to send downlink information by using a first period according to a first pattern; the determining unit is configured to determine to change a transmission period and/or a transmission pattern of the downlink information; and the sending unit is further configured to send the downlink information by using a second period according to the first pattern, or by using the first period according to a second pattern, or by using a second period according to a second pattern when the determining unit determines to change the transmission period and/or the transmission pattern of the downlink information, where the second period is less than the first period, and orthogonal frequency division multiplexing (OFDM) symbols occupied by the second pattern are more than OFDM symbols occupied by the first pattern.

With reference to the second aspect, in a first possible implementation of the second aspect, the first base station further includes a detection unit and a receiving unit, where the detection unit is configured to detect whether a measurement value of an uplink pilot sent by user equipment (UE) is greater than a specified value; the receiving unit is configured to receive a proximity instruction message, an access sequence, or a scheduling request signal that are sent by the UE; the receiving unit is further configured to receive a first instruction message sent by a second base station, where the first instruction message is used to instruct the first base station to change the transmission period and/or the transmission pattern of the downlink information; and the determining unit is specifically configured to: after determining that a preset condition is satisfied, determine to change the transmission period and/or the transmission pattern of the downlink information, where the preset condition includes that the detection unit detects that the measurement value of the uplink pilot sent by the UE is greater than the specified value, or that the receiving unit receives the proximity instruction message, the access sequence, or the scheduling request signal sent by the UE, or that the receiving unit receives the first instruction message sent by the second base station.

With reference to the first possible implementation of the second aspect, in a second possible implementation of the second aspect, the sending unit is further configured to: after sending the downlink information, after the UE accesses the first base station, send the downlink information at a preset time point by using the first period according to the first pattern, or send the downlink information by using the first period according to the first pattern after a preset time.

With reference to the first possible implementation of the second aspect or the second possible implementation of the second aspect, in a third possible implementation of the second aspect, the sending unit is further configured to: when the preset condition is that the receiving unit receives the first instruction message sent by the second base station, after the sending unit sends the downlink information, send an identifier of the second period and/or an identifier of the second pattern to the second base station; or the receiving unit is further configured to: when the preset condition is that the receiving unit receives the first instruction message sent by the second base station, after the sending unit sends the downlink information, receive a request message sent by the second base station, where the request message is used to request to obtain an identifier of the second period and/or an identifier of the second pattern; and the sending unit is further configured to send a request response message to the second base station, where the request response message carries the identifier of the second period and/or the identifier of the second pattern.

With reference to the first possible implementation of the second aspect or the second possible implementation of the second aspect, in a fourth possible implementation of the second aspect, the sending unit is further configured to: when the preset condition is that the detection unit detects that the measurement value of the uplink pilot sent by the user equipment (UE) is greater than the specified value, or that the receiving unit receives the proximity instruction message, the access sequence, or the scheduling request signal sent by the UE, after sending the downlink information, send a second instruction message to the UE, where the second instruction message is used to indicate that the period and/or the pattern used by the first base station to send the downlink information have been changed.

With reference to the fourth possible implementation of the second aspect, in a fifth possible implementation of the second aspect, the second instruction message carries an identifier of the second period and/or an identifier of the second pattern.

With reference to the fourth possible implementation of the second aspect or the fifth possible implementation of the first aspect, in a sixth possible implementation of the second aspect, the sending unit is further configured to: after sending the downlink information, send the second instruction message to at least one first UE covered by the first base station.

With reference to any one of the second aspect to the sixth possible implementation of the second aspect, in a seventh possible implementation of the second aspect, the downlink information includes a downlink common signal and/or a part or all of downlink common information.

According to a third aspect, a first base station is provided, where the first base station includes a transmitter and a processor, where the transmitter is configured to send downlink information by using a first period according to a first pattern; the processor is configured to determine to change a transmission period and/or a transmission pattern of the downlink information; and the transmitter is further configured to send the downlink information by using a second period according to the first pattern, or by using the first period according to a second pattern, or by using a second period according to a second pattern when the processor determines to change the transmission period and/or the transmission pattern of the downlink information, where the second period is less than the first period, and orthogonal frequency division multiplexing (OFDM) symbols occupied by the second pattern are more than OFDM symbols occupied by the first pattern.

With reference to the third aspect, in a first possible implementation of the third aspect, the first base station further includes a receiver, where the processor is further configured to detect whether a measurement value of an uplink pilot sent by user equipment (UE) is greater than a specified value; the receiver is configured to receive a proximity instruction message, an access sequence, or a scheduling request signal that are sent by the UE; the receiver is further configured to receive a first instruction message sent by a second base station, where the first instruction message is used to instruct the first base station to change the transmission period and/or the transmission pattern of the downlink information; and the processor is specifically configured to: after determining that a preset condition is satisfied, determine to change the transmission period and/or the transmission pattern of the downlink information, where the preset condition includes that the processor detects that the measurement value of the uplink pilot sent by the UE is greater than the specified value, or that the receiver receives the proximity instruction message, the access sequence, or the scheduling request signal sent by the UE, or that the receiver receives the first instruction message sent by the second base station.

With reference to the first possible implementation of the third aspect, in a second possible implementation of the third aspect, the transmitter is further configured to: after sending the downlink information, after the UE accesses the first base station, send the downlink information at a preset time point by using the first period according to the first pattern, or send the downlink information by using the first period according to the first pattern after a preset time.

With reference to the first possible implementation of the third aspect or the second possible implementation of the third aspect, in a third possible implementation of the third aspect, the transmitter is further configured to: when the preset condition is that the receiver receives the first instruction message sent by the second base station, after sending the downlink information, send an identifier of the second period and/or an identifier of the second pattern to the second base station; or the receiver is further configured to: when the preset condition is that the receiver receives the first instruction message sent by the second base station, after sending the downlink information, receive a request message sent by the second base station, where the request message is used to request to obtain an identifier of the second period and/or an identifier of the second pattern; and the transmitter is further configured to send a request response message to the second base station, where the request response message carries the identifier of the second period and/or the identifier of the second pattern.

With reference to the first possible implementation of the third aspect or the second possible implementation of the third aspect, in a fourth possible implementation of the third aspect, the transmitter is further configured to: when the preset condition is that the detection unit detects that the measurement value of the uplink pilot sent by the user equipment (UE) is greater than the specified value, or that the receiver receives the proximity instruction message, the access sequence, or the scheduling request signal sent by the UE, after sending the downlink information, send a second instruction message to the UE, where the second instruction message is used to indicate that the period and/or the pattern used by the first base station to send the downlink information have been changed.

With reference to the fourth possible implementation of the third aspect, in a fifth possible implementation of the third aspect, the second instruction message carries an identifier of the second period and/or an identifier of the second pattern.

With reference to the fourth possible implementation of the third aspect or the fifth possible implementation of the third aspect, in a sixth possible implementation of the third aspect, the transmitter is further configured to: after sending the downlink information, send the second instruction message to at least one first UE covered by the first base station.

With reference to any one of the third aspect to the sixth possible implementation of the third aspect, in a seventh possible implementation of the third aspect, the downlink information includes a downlink common signal and/or a part or all of downlink common information.

According to a fourth aspect, a downlink information transmission method is provided, where the method includes: sending, by a second base station, a first instruction message to a first base station after receiving indication information sent by user equipment (UE), where the indication information is used to indicate that the UE detects that a measurement value of a downlink pilot sent by the first base station is greater than a specified value, and the first instruction message is used to instruct the first base station to change a period and/or a pattern for sending downlink information; and sending, by the second base station, a second instruction message to the UE, where the second instruction message is used to indicate that the period and/or the pattern used by the first base station to send the downlink information have been changed.

With reference to the fourth aspect, in a first possible implementation of the fourth aspect, after the sending, by a second base station, a first instruction message to a first base station, and before the sending, by the second base station, a second instruction message to the UE, the method further includes: obtaining, by the second base station, an identifier of a second period and/or an identifier of a second pattern, where the second period is a transmission period obtained after the first base station changes the period for sending the downlink information, and the second pattern is a transmission pattern obtained after the first base station changes the pattern for sending the downlink information.

With reference to the first possible implementation of the fourth aspect, in a second possible implementation of the fourth aspect, the obtaining, by the second base station, an identifier of a second period and/or an identifier of a second pattern includes: receiving, by the second base station, the identifier of the second period and/or the identifier of the second pattern that are sent by the first base station; or sending, by the second base station, a request message to the first base station, where the request message is used to request to obtain the identifier of the second period and/or the identifier of the second pattern; and receiving, by the second base station, a request response message sent by the first base station, and obtaining the identifier of the second period and/or the identifier of the second pattern according to the request response message, where the request response message carries the identifier of the second period and/or the identifier of the second pattern.

With reference to any one of the fourth aspect to the second possible implementation of the fourth aspect, in a third possible implementation of the fourth aspect, after the sending, by a second base station, a first instruction message to a first base station, the method further includes: sending, by the second base station, the second instruction message to at least one first UE covered by the first base station.

With reference to any one of the fourth aspect to the third possible implementation of the fourth aspect, in a fourth possible implementation of the fourth aspect, the downlink information includes a downlink common signal and/or a part or all of downlink common information.

According to a fifth aspect, a second base station is provided, where the second base station includes a receiving unit and a sending unit, where the receiving unit is configured to receive indication information sent by user equipment (UE), where the indication information is used to indicate that the UE detects that a measurement value of a downlink pilot sent by a first base station is greater than a specified value; the sending unit is configured to: after the receiving unit receives the indication information sent by the UE, send a first instruction message to the first base station, where the first instruction message is used to instruct the first base station to change a period and/or a pattern for sending downlink information; and the sending unit is further configured to send a second instruction message to the UE, where the second instruction message is used to indicate that the period and/or the pattern used by the first base station to send the downlink information have been changed.

With reference to the fifth aspect, in a first possible implementation of the fifth aspect, the second base station further includes an obtaining unit, where the obtaining unit is configured to: after the sending unit sends the first instruction message to the first base station, before the sending unit sends the second instruction message to the UE, obtain an identifier of a second period and/or an identifier of a second pattern, where the second period is a transmission period obtained after the first base station changes the period for sending the downlink information, and the second pattern is a transmission pattern obtained after the first base station changes the pattern for sending the downlink information.

With reference to the first possible implementation of the fifth aspect, in a second possible implementation of the fifth aspect, the obtaining unit is specifically configured to: receive the identifier of the second period and/or the identifier of the second pattern that are sent by the first base station; or send a request message to the first base station, where the request message is used to request to obtain the identifier of the second period and/or the identifier of the second pattern; and receive a request response message sent by the first base station, and obtain the identifier of the second period and/or the identifier of the second pattern according to the request response message, where the request response message carries the identifier of the second period and/or the identifier of the second pattern.

With reference to any one of the fifth aspect to the second possible implementation of the fifth aspect, in a third possible implementation of the fifth aspect, the sending unit is further configured to: after sending the first instruction message to the first base station, send the second instruction message to at least one first UE covered by the first base station.

With reference to any one of the fifth aspect to the third possible implementation of the fifth aspect, in a fourth possible implementation of the fifth aspect, the downlink information includes a downlink common signal and/or a part or all of downlink common information.

According to a sixth aspect, a second base station is provided, where the second base station includes a receiver and a transmitter, where the receiver is configured to receive indication information sent by user equipment (UE), where the indication information is used to indicate that the UE detects that a measurement value of a downlink pilot sent by a first base station is greater than a specified value; the transmitter is configured to: after the receiving unit receives the indication information sent by the UE, send a first instruction message to the first base station, where the first instruction message is used to instruct the first base station to change a period and/or a pattern for sending downlink information; and the transmitter is further configured to send a second instruction message to the UE, where the second instruction message is used to indicate that the period and/or the pattern used by the first base station to send the downlink information have been changed.

With reference to the sixth aspect, in a first possible implementation of the sixth aspect, the second base station further includes a processor, where the processor is configured to: after the transmitter sends the first instruction message to the first base station, before the transmitter sends the second instruction message to the UE, obtain an identifier of a second period and/or an identifier of a second pattern, where the second period is a transmission period obtained after the first base station changes the period for sending the downlink information, and the second pattern is a transmission pattern obtained after the first base station changes the pattern for sending the downlink information.

With reference to the first possible implementation of the sixth aspect, in a second possible implementation of the sixth aspect, the processor is specifically configured to: receive the identifier of the second period and/or the identifier of the second pattern that are sent by the first base station; or send a request message to the first base station, where the request message is used to request to obtain the identifier of the second period and/or the identifier of the second pattern; and receive a request response message sent by the first base station, and obtain the identifier of the second period and/or the identifier of the second pattern according to the request response message, where the request response message carries the identifier of the second period and/or the identifier of the second pattern.

With reference to any one of the sixth aspect to the second possible implementation of the sixth aspect, in a third possible implementation of the sixth aspect, the transmitter is further configured to: after sending the first instruction message to the first base station, send the second instruction message to at least one first UE covered by the first base station.

With reference to any one of the sixth aspect to the third possible implementation of the sixth aspect, in a fourth possible implementation of the sixth aspect, the downlink information includes a downlink common signal and/or a part or all of downlink common information.

According to a seventh aspect, a downlink information transmission method is provided, where the method includes: determining, by user equipment (UE), that a first base station has changed a period and/or a pattern for sending downlink information, and obtaining, by the UE, a period and a pattern that are used by the first base station to send the downlink information; and receiving, by the UE according to the period and the pattern, the downlink information sent by the first base station.

With reference to the seventh aspect, in a first possible implementation of the seventh aspect, the determining, by UE, that a first base station has changed a period and/or a pattern for sending downlink information includes: after the UE determines that a preset condition is satisfied, determining, by the UE, that the first base station has changed the period and/or the pattern for sending the downlink information, where the preset condition includes that the UE detects that a measurement value of a downlink pilot sent by the first base station is greater than a specified value, or that fingerprint information obtained by the UE matches pre-stored fingerprint information, or that geographical location information of a current location of the UE matches pre-stored geographical location information, or that the UE receives an instruction message sent by the first base station or a second base station, where the instruction message is used to indicate that the period and/or the pattern used by the first base station to send the downlink information have been changed.

With reference to the first possible implementation of the seventh aspect, in a second possible implementation of the seventh aspect, when the preset condition is that the UE detects that the measurement value of the downlink pilot sent by the first base station is greater than the specified value, or that the fingerprint information obtained by the UE matches the pre-stored fingerprint information, or that the geographical location information of the current location of the UE matches the pre-stored geographical location information, after the UE determines that the preset condition is satisfied, the method further includes: sending, by the UE, indication information to the first base station, where the indication information is used to indicate that the UE detects that the measurement value of the downlink pilot sent by the first base station is greater than the specified value, or the fingerprint information obtained by the UE matches the pre-stored fingerprint information, or the geographical location information of the current location of the UE matches the pre-stored geographical location information.

With reference to any one of the seventh aspect to the second possible implementation of the seventh aspect, in a third possible implementation of the seventh aspect, when the preset condition is that the UE detects that the measurement value of the downlink pilot sent by the first base station is greater than the specified value, or that the fingerprint information obtained by the UE matches the pre-stored fingerprint information, or that the geographical location information of the current location of the UE matches the pre-stored geographical location information, the obtaining, by the UE, a period and a pattern that are used by the first base station to send the downlink information includes: obtaining, by the UE according to pre-stored configuration information, the period and the pattern that are used by the first base station to send the downlink information.

With reference to the seventh aspect or the first possible implementation of the seventh aspect, in a fourth possible implementation of the seventh aspect, when the preset condition is that the UE receives the instruction message sent by the first base station or the second base station, the obtaining, by the UE, a period and a pattern that are used by the first base station to send the downlink information includes: determining, by the UE, that the instruction message carries only a second period, obtaining, by the UE, the second period carried in the instruction message, and obtaining a first pattern according to pre-stored configuration information, where the second period is a transmission period obtained after the first base station changes the period for sending the downlink information, and the first pattern is a transmission pattern obtained before the first base station changes the period for sending the downlink information; and the receiving, by the UE according to the period and the pattern, the downlink information sent by the first base station includes: receiving, by the UE according to the second period and the first pattern, the downlink information sent by the first base station.

With reference to the seventh aspect or the first possible implementation of the seventh aspect, in a fifth possible implementation of the seventh aspect, when the preset condition is that the UE receives the instruction message sent by the first base station or the second base station, the obtaining, by the UE, a period and a pattern that are used by the first base station to send the downlink information includes: determining, by the UE, that the instruction message carries only an identifier of a second pattern, obtaining, by the UE, the second pattern according to the identifier of the second pattern, and obtaining a first period according to pre-stored configuration information, where the second pattern is a transmission pattern obtained after the first base station changes the pattern for sending the downlink information, and the first period is a transmission period obtained before the first base station changes the pattern for sending the downlink information; and the receiving, by the UE according to the period and the pattern, the downlink information sent by the first base station includes: receiving, by the UE according to the first period and the second pattern, the downlink information sent by the first base station.

With reference to the seventh aspect or the first possible implementation of the seventh aspect, in a sixth possible implementation of the seventh aspect, when the preset condition is that the UE receives the instruction message sent by the first base station or the second base station, the obtaining, by the UE, a period and a pattern that are used by the first base station to send the downlink information includes: determining, by the UE, that the instruction message carries an identifier of a second period and an identifier of a second pattern, obtaining, by the UE, the second period and the identifier of the second pattern that are carried in the instruction message, and obtaining the second pattern according to the identifier of the second pattern, where the first period is a transmission period obtained after the first base station changes the period for sending the downlink information, and the second pattern is a transmission pattern obtained after the first base station changes the pattern for sending the downlink information; and the receiving, by the UE according to the period and the pattern, the downlink information sent by the first base station includes: receiving, by the UE according to the second period and the second pattern, the downlink information sent by the first base station.

With reference to any one of the seventh aspect to the sixth possible implementation of the seventh aspect, in a seventh possible implementation of the seventh aspect, the downlink information includes a downlink common signal and/or a part or all of downlink common information.

According to an eighth aspect, user equipment (UE) is provided, where the UE includes a determining unit, an obtaining unit, and a receiving unit, where the determining unit is configured to determine that a first base station has changed a period and/or a pattern for sending downlink information: the obtaining unit is configured to obtain a period and a pattern that are used by the first base station to send the downlink information; and the receiving unit is configured to receive, according to the period and the pattern, the downlink information sent by the first base station.

With reference to the eighth aspect, in a first possible implementation of the eighth aspect, the UE further includes a detection unit, where the detection unit is configured to detect whether a measurement value of a downlink pilot sent by the first base station is greater than a specified value, whether fingerprint information obtained by the UE matches pre-stored fingerprint information, and whether geographical location information of a current location of the UE matches pre-stored geographical location information; the receiving unit is further configured to receive an instruction message sent by the first base station or a second base station, where the instruction message is used to indicate that the period and/or the pattern used by the first base station to send the downlink information have been changed; and the determining unit is specifically configured to: after determining that a preset condition is satisfied, determine that the first base station has changed the period and/or the pattern for sending the downlink information, where the preset condition includes that the detection unit detects that the measurement value of the downlink pilot sent by the first base station is greater than the specified value, or that the fingerprint information obtained by the UE matches the pre-stored fingerprint information, or that the geographical location information of the current location of the UE matches the pre-stored geographical location information, or that the receiving unit receives the instruction message sent by the first base station or the second base station.

With reference to the first possible implementation of the eighth aspect, in a second possible implementation of the eighth aspect, the UE further includes a sending unit, where the sending unit is configured to: When the preset condition is that the detection unit detects that the measurement value of the downlink pilot sent by the first base station is greater than the specified value, or that the fingerprint information obtained by the UE matches the pre-stored fingerprint information, or that the geographical location information of the current location of the UE matches the pre-stored geographical location information, after the determining unit determines that the preset condition is satisfied, send indication information to the first base station, where the indication information is used to indicate that the detection unit detects that the measurement value of the downlink pilot sent by the first base station is greater than the specified value, or the fingerprint information obtained by the UE matches the pre-stored fingerprint information, or the geographical location information of the current location of the UE matches the pre-stored geographical location information.

With reference to any one of the eighth aspect to the second possible implementation of the eighth aspect, in a third possible implementation of the eighth aspect, the obtaining unit is specifically configured to: when the preset condition is that the detection unit detects that the measurement value of the downlink pilot sent by the first base station is greater than the specified value, or that the fingerprint information obtained by the UE matches the pre-stored fingerprint information, or that the geographical location information of the current location of the UE matches the pre-stored geographical location information, obtain, according to pre-stored configuration information, the period and the pattern that are used by the first base station to send the downlink information.

With reference to the eighth aspect or the first possible implementation of the eighth aspect, in a fourth possible implementation of the eighth aspect, the obtaining unit is specifically configured to: when the preset condition is that the receiving unit receives the instruction message sent by the first base station or the second base station, determine that the instruction message carries only a second period, obtain the second period carried in the instruction message, and obtain a first pattern according to pre-stored configuration information, where the second period is a transmission period obtained after the first base station changes the period for sending the downlink information, and the first pattern is a transmission pattern obtained before the first base station changes the period for sending the downlink information; and the receiving unit is specifically configured to receive, according to the second period and the first pattern, the downlink information sent by the first base station.

With reference to the eighth aspect or the first possible implementation of the eighth aspect, in a fifth possible implementation of the eighth aspect, the obtaining unit is specifically configured to: when the preset condition is that the receiving unit receives the instruction message sent by the first base station or the second base station, determine that the instruction message carries only an identifier of a second pattern, obtain the second pattern according to the identifier of the second pattern, and obtain a first period according to pre-stored configuration information, where the second pattern is a transmission pattern obtained after the first base station changes the pattern for sending the downlink information, and the first period is a transmission period obtained before the first base station changes the pattern for sending the downlink information; and the receiving unit is specifically configured to receive, according to the first period and the second pattern, the downlink information sent by the first base station.

With reference to the eighth aspect or the first possible implementation of the eighth aspect, in a sixth possible implementation of the eighth aspect, the obtaining unit is specifically configured to: when the preset condition is that the receiving unit receives the instruction message sent by the first base station or the second base station, determine that the instruction message carries an identifier of a second period and an identifier of a second pattern, obtain the identifier of the second period and the identifier of the second pattern that are carried in the instruction message, and obtain the second pattern according to the identifier of the second pattern, where the first period is a transmission period obtained after the first base station changes the period for sending the downlink information, and the second pattern is a transmission pattern obtained after the first base station changes the pattern for sending the downlink information; and the receiving unit is specifically configured to receive, according to the second period and the second pattern, the downlink information sent by the first base station.

With reference to any one of the eighth aspect to the sixth possible implementation of the eighth aspect, in a seventh possible implementation of the eighth aspect, the downlink information includes a downlink common signal and/or a part or all of downlink common information.

According to a ninth aspect, user equipment (UE) is provided, where the UE includes a processor and a receiver, where the processor is configured to determine that a first base station has changed a period and/or a pattern for sending downlink information; the processor is further configured to obtain a period and a pattern that are used by the first base station to send the downlink information; and the receiver is configured to receive, according to the period and the pattern, the downlink information sent by the first base station.

With reference to the ninth aspect, in a first possible implementation of the ninth aspect, the processor is further configured to detect whether a measurement value of a downlink pilot sent by the first base station is greater than a specified value, whether fingerprint information obtained by the UE matches pre-stored fingerprint information, and whether geographical location information of a current location of the UE matches pre-stored geographical location information; the receiver is further configured to receive an instruction message sent by the first base station or a second base station, where the instruction message is used to indicate that the period and/or the pattern used by the first base station to send the downlink information have been changed; and the processor is specifically configured to: after determining that a preset condition is satisfied, determine that the first base station has changed the period and/or the pattern for sending the downlink information, where the preset condition includes that the processor detects that the measurement value of the downlink pilot sent by the first base station is greater than the specified value, or that the fingerprint information obtained by the UE matches the pre-stored fingerprint information, or that the geographical location information of the current location of the UE matches the pre-stored geographical location information, or that the receiver receives the instruction message sent by the first base station or the second base station.

With reference to the first possible implementation of the ninth aspect, in a second possible implementation of the ninth aspect, the UE further includes a transmitter, where the transmitter is configured to: when the preset condition is that the processor detects that the measurement value of the downlink pilot sent by the first base station is greater than the specified value, or that the fingerprint information obtained by the UE matches the pre-stored fingerprint information, or that the geographical location information of the current location of the UE matches the pre-stored geographical location information, after the processor determines that the preset condition is satisfied, send indication information to the first base station, where the indication information is used to indicate that the processor detects that the measurement value of the downlink pilot sent by the first base station is greater than the specified value, or the fingerprint information obtained by the UE matches the pre-stored fingerprint information, or the geographical location information of the current location of the UE matches the pre-stored geographical location information.

With reference to any one of the ninth aspect to the second possible implementation of the ninth aspect, in a third possible implementation of the ninth aspect, the processor is specifically configured to: when the preset condition is that the processor detects that the measurement value of the downlink pilot sent by the first base station is greater than the specified value, or that the fingerprint information obtained by the UE matches the pre-stored fingerprint information, or that the geographical location information of the current location of the UE matches the pre-stored geographical location information, obtain, according to pre-stored configuration information, the period and the pattern that are used by the first base station to send the downlink information.

With reference to the ninth aspect or the first possible implementation of the ninth aspect, in a fourth possible implementation of the ninth aspect, the processor is specifically configured to: when the preset condition is that the receiver receives the instruction message sent by the first base station or the second base station, determine that the instruction message carries only a second period, obtain the second period carried in the instruction message, and obtain a first pattern according to pre-stored configuration information, where the second period is a transmission period obtained after the first base station changes the period for sending the downlink information, and the first pattern is a transmission pattern obtained before the first base station changes the period for sending the downlink information; and the receiver is specifically configured to receive, according to the second period and the first pattern, the downlink information sent by the first base station.

With reference to the ninth aspect or the first possible implementation of the ninth aspect, in a fifth possible implementation of the ninth aspect, the processor is specifically configured to: when the preset condition is that the receiver receives the instruction message sent by the first base station or the second base station, determine that the instruction message carries only an identifier of a second pattern, obtain the second pattern according to the identifier of the second pattern, and obtain a first period according to pre-stored configuration information, where the second pattern is a transmission pattern obtained after the first base station changes the pattern for sending the downlink information, and the first period is a transmission period obtained before the first base station changes the pattern for sending the downlink information; and the receiver is specifically configured to receive, according to the first period and the second pattern, the downlink information sent by the first base station.

With reference to the ninth aspect or the first possible implementation of the ninth aspect, in a sixth possible implementation of the ninth aspect, the processor is specifically configured to: when the preset condition is that the receiver receives the instruction message sent by the first base station or the second base station, determine that the instruction message carries an identifier of a second period and an identifier of a second pattern, obtain the identifier of the second period and the identifier of the second pattern that are carried in the instruction message, and obtain the second pattern according to the identifier of the second pattern, where the first period is a transmission period obtained after the first base station changes the period for sending the downlink information, and the second pattern is a transmission pattern obtained after the first base station changes the pattern for sending the downlink information; and the receiver is specifically configured to receive, according to the second period and the second pattern, the downlink information sent by the first base station.

With reference to any one of the ninth aspect to the sixth possible implementation of the ninth aspect, in a seventh possible implementation of the ninth aspect, the downlink information includes a downlink common signal and/or a part or all of downlink common information.

Different from the prior art, by using the downlink information transmission method, the base station, and the user equipment that are provided in the embodiments of the present invention, the base station does not send downlink information by using a fixed period or according to a fixed pattern, but sends downlink information by using relatively many time frequency resources when determining to change a transmission period and/or a transmission pattern of the downlink information (if UE is to use a resource of the base station), so that the UE can receive the downlink information in time, and establish a wireless connection to the base station rapidly according to the downlink information. Therefore, compared with the prior art, by means of the downlink information transmission method provided in the embodiments of the present invention, it can be ensured that UE can obtain downlink information in time, and further can establish a wireless connection to a base station rapidly, thereby reducing a time for the UE to access a network, and further improving user experience.

BRIEF DESCRIPTION OF DRAWINGS

FIG. 2(d) is a third diagram of a time frequency resource used to send downlink information according to an embodiment of the present invention;

FIG. 3(a) is a schematic flowchart of another downlink information transmission method according to an embodiment of the present invention;

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art by using the embodiments of the present invention without creative efforts shall fall within the protection scope of the present invention.

To facilitate clear description of the technical solutions in the embodiments of the present invention, words such as "first", "second", and "third", are used in the embodiments of the present invention to distinguish between same items or similar items with basically same functions or purposes. A person skilled in the art may understand that the words such as "first", "second", and "third" do not restrict a quantity and an implementation sequence.

It should be noted that the embodiments of the present invention may be applied to an existing Long Term Evolution (LTE) mobile communications system, or may be applied to an evolved wireless communications system by using an LTE mobile communications system. This is not specifically limited in the embodiments of the present invention.

In addition, it should further be noted that characteristics in the embodiments of the present invention may be combined with each other if they do not conflict with each other. This is not specifically limited in the embodiments of the present invention.

Figures 1, 2A:
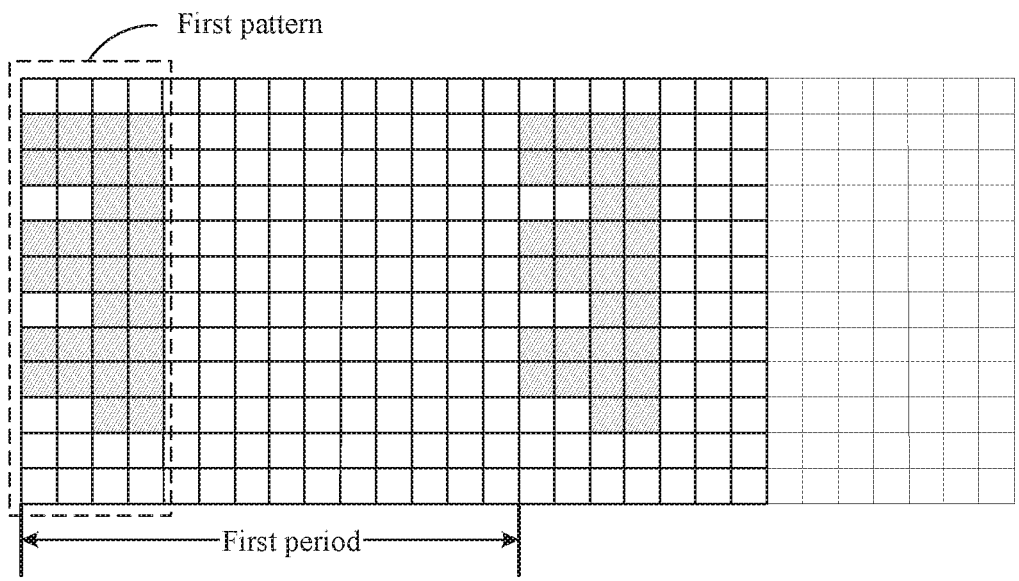
FIG. 1 is a schematic flowchart of a downlink information transmission method according to an embodiment of the present invention.
FIG. 2(a) is a diagram of a time frequency resource used by a base station to send downlink information.

As shown in FIG. 1, an embodiment of the present invention provides a downlink information transmission method.

S101. A first base station sends downlink information by using a first period according to a first pattern.

S102. The first base station sends the downlink information by using a second period according to the first pattern, or by using the first period according to a second pattern, or by using a second period according to a second pattern when the first base station determines to change a transmission period and/or a transmission pattern of the downlink information.

The second period is less than the first period, and orthogonal frequency division multiplexing (OFDM) symbols occupied by the second pattern are more than OFDM symbols occupied by the first pattern. The first pattern and the second pattern are distribution statuses of the downlink information in a unit time frequency resource.

It should be noted that a person of ordinary skill in the art easily understands that the first base station may be specifically one or more cells of the first base station, and a second base station may be specifically a user plane site or a control plane site of UE. This is not specifically limited in this embodiment of the present invention. The downlink information may specifically include a downlink common signal and/or a part or all of downlink common information. The downlink common signal may be specifically a cell reference signal, a synchronization signal, a discovery signal, or the like, and the downlink common information may be specifically a system broadcast message.

That is, when determining to change the transmission period and/or the transmission pattern of the downlink information, the first base station may change only the period for sending the downlink information, or may change only the pattern for sending the downlink information, or may change both the period and the pattern for sending the downlink information.

Figure 2B:
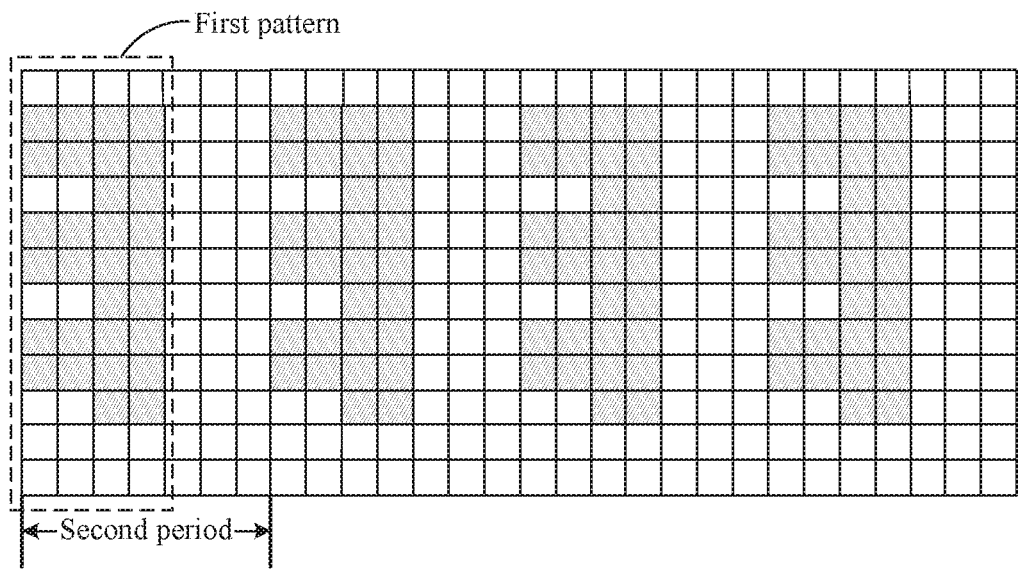
FIG. 2(b) is a first diagram of a time frequency resource used to send downlink information according to an embodiment of the present invention.
Figure 2C:
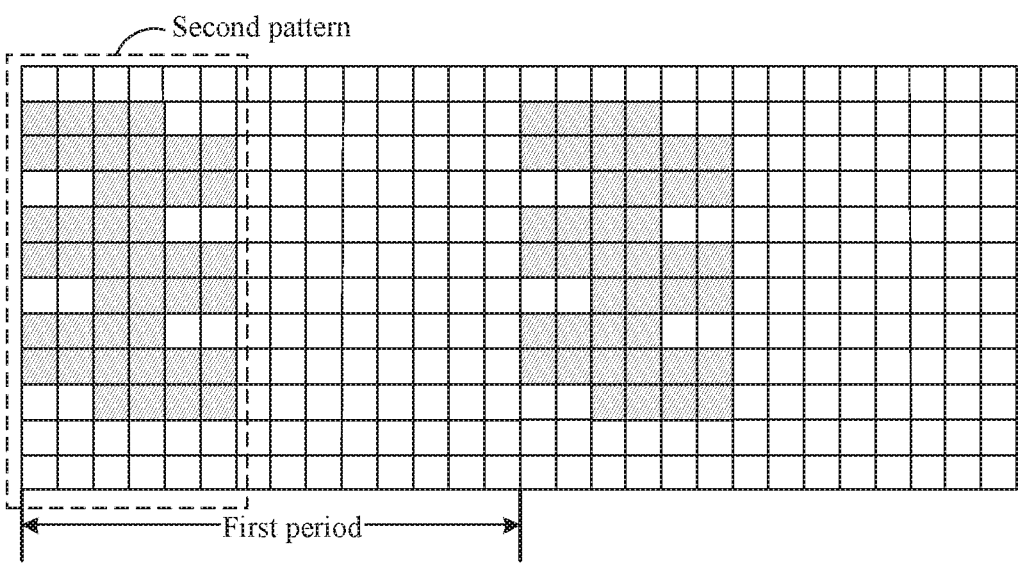
FIG. 2(c) is a second diagram of a time frequency resource used to send downlink information according to an embodiment of the present invention.

For example, it is assumed that the first base station originally sends the downlink information according to the first period and the first pattern that are shown in FIG. 2 (a) (in the figure, the horizontal coordinate represents a time domain, the vertical coordinate represents a frequency domain, each grid represents a resource element, a slashed grid represents that the resource element is used to carry downlink information, and a blank grid represents that the resource element is not used to carry downlink information). When determining to change the transmission period and/or the transmission pattern of the downlink information, the first base station may send the downlink information according to the second period and the first pattern that are shown in FIG. 2(b). That is, the first base station changes the transmission period to the second period but does not change the transmission pattern. Alternatively, the first base station may send the downlink information according to the first period and the second pattern that are shown in FIG. 2(c). That is, the first base station changes the transmission pattern to the second pattern but does not change the transmission period. Alternatively, the first base station may send the downlink information according to the second period and the second pattern that are shown in FIG. 2(d). That is, the first base station changes the transmission period to the second period and changes the transmission pattern to the second pattern.

Preferably, in the downlink information transmission method provided in this embodiment of the present invention, that the first base station determines to change a transmission period and/or a transmission pattern of the downlink information may specifically include:

after the first base station determines that a preset condition is satisfied, determining, by the first base station, to change the transmission period and/or the transmission pattern of the downlink information.

The preset condition includes that the first base station detects that a measurement value of an uplink pilot sent by user equipment (UE) is greater than a specified value, or that the first base station receives a proximity instruction message, an access sequence, or a scheduling request signal sent by the UE, or that the first base station receives a first instruction message sent by a second base station, where the first instruction message is used to instruct the first base station to change the transmission period and/or the transmission pattern of the downlink information.

That is, the first base station may detect a probe signal sent by the UE, to determine whether the UE approaches the first base station. Alternatively, the UE may detect a pilot signal sent by the first base station, to determine that the UE approaches the first base station, and perform reporting to the first base station. This is not specifically limited in this embodiment of the present invention.

The measurement value of the uplink pilot may be specifically signal strength, signal quality, or a channel quality indicator (CQI). This is not specifically limited in this embodiment of the present invention.

Further, as shown in FIG. 3(a), after the sending, by the first base station, the downlink information (that is, S102), the downlink information transmission method provided in this embodiment of the present invention may further include S103a.

S103a. After UE accesses the first base station, the first base station sends the downlink information at a preset time point by using the first period according to the first pattern.

Figure 3B:
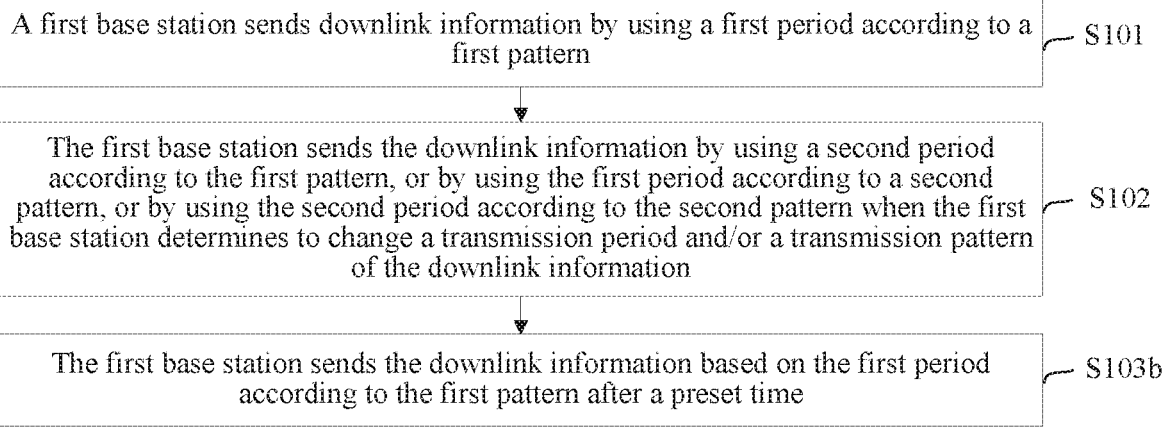
FIG. 3(b) is a schematic flowchart of still another downlink information transmission method according to an embodiment of the present invention.

Alternatively, as shown in FIG. 3(b), after the sending, by the first base station, the downlink information (that is, S102), the method includes S103b.

S103b. The first base station sends the downlink information by using the first period according to the first pattern after a preset time.

That is, after the UE accesses a network and does not need to obtain the downlink information of the first base station, or after the first base station sends the downlink information by using the changed transmission period and/or pattern for a period of time, the base station sends the downlink information by using a relatively few time frequency resources, so that overheads of downlink information sending can be reduced, more time frequency resources are used to send data, and further a downlink capacity and downlink resource utilization are improved.

Optionally, when the preset condition is that the first base station receives the first instruction message sent by the second base station, after the sending, by the first base station, the downlink information, the downlink information transmission method provided in this embodiment of the present invention may further include:

sending, by the first base station, the second period and/or an identifier of the second pattern to the second base station; or receiving, by the first base station, a request message sent by the second base station, where the request message is used to request to obtain an identifier of the second period and/or an identifier of the second pattern; and sending, by the first base station, a request response message to the second base station, where the request response message carries the identifier of the second period and/or the identifier of the second pattern.

Figure 4:
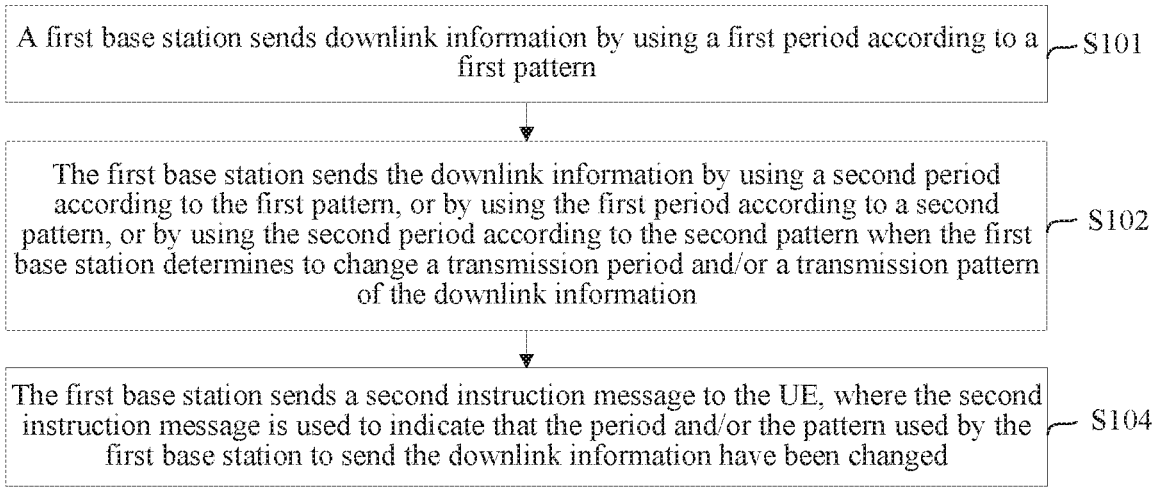
FIG. 4 is a schematic flowchart of still another downlink information transmission method according to an embodiment of the present invention.

Optionally, as shown in FIG. 4, when the preset condition is that the first base station detects that the measurement value of the uplink pilot sent by the user equipment (UE) is greater than the specified value, or that the first base station receives the proximity instruction message, the access sequence, or the scheduling request signal sent by the UE, after the sending, by the first base station, the downlink information (that is, S102), the downlink information transmission method provided in this embodiment of the present invention may further include S104.

S104. The first base station sends a second instruction message to UE, where the second instruction message is used to indicate that the period and/or the pattern used by the first base station to send the downlink information have been changed.

Optionally, the second instruction message carries an identifier of the second period and/or an identifier of the second pattern.

It should be noted that the base station side and the UE side may pre-agree on the period and the pattern (that is, the first period and the first pattern) that are obtained before the base station side changes the period and/or the pattern for sending the downlink information, and the base station side adds the second period and/or the identifier of the second pattern to the second instruction message, to notify the UE of the changed period and/or pattern.

Further, the base station side and the UE side may further agree on the period and the pattern (that is, the second period and the second pattern) that are obtained after the base station side changes the period and/or the transmission pattern for sending the downlink information. In this case, the second instruction message indicates only that the period and/or the pattern used by the base station to send the downlink information have been changed, and does not need to carry information.

Certainly, if the base station side and the UE side do not pre-agree on the first period, the first pattern, the second period, or the second pattern, the base station side may add the first period or the second period and an identifier of the first pattern or the identifier of the second pattern to the second instruction message, to notify the UE of the period and the pattern that are currently used by the base station to send the downlink information. This is not specifically limited in this embodiment of the present invention.

Figure 5:
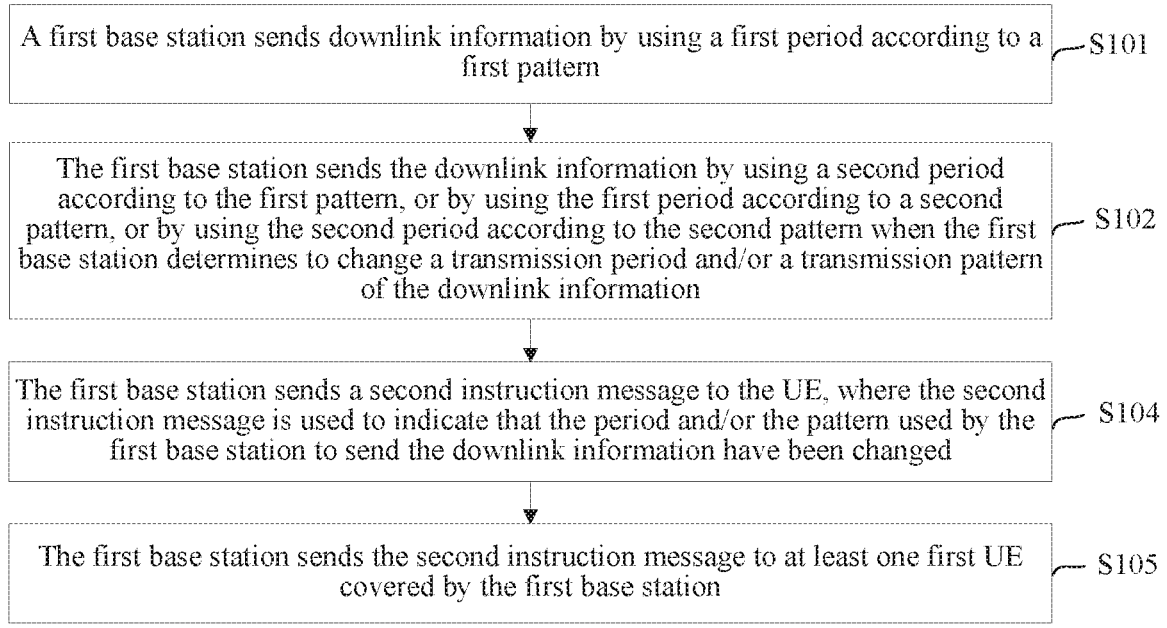
FIG. 5 is a schematic flowchart of still another downlink information transmission method according to an embodiment of the present invention.

Further, as shown in FIG. 5, after the sending, by the first base station, the downlink information (that is, S102), the downlink information transmission method provided in this embodiment of the present invention may further include S105.

S105. The first base station sends the second instruction message to at least one first UE covered by the first base station.

That is, if the at least one first UE covered by the first base station still needs to use the downlink information of the first base station, after changing the transmission period and/or pattern of the downlink information, in addition to notifying the UE that the period and/or the pattern used by the first base station to send the downlink information have been changed, the first base station further needs to notify the at least one first UE.

In addition, it should be noted that a person of ordinary skill in the art easily understands that when the first base station changes the transmission period and/or the transmission pattern of the downlink information, as described in this embodiment of the present invention, the first base station may first changes the transmission period and/or pattern of the downlink information, and then notify the UE and the first UE that the transmission period and/or pattern have been changed. In another possible implementation, when determining to change the transmission period and/or the transmission pattern of the downlink information, the first base station may first send an instruction message to the UE and the first UE, to notify the UE and the first UE that the first base station is to change, at a particular time point, the period and/or the pattern for sending the downlink information, and then change, at the time point, the period and/or the pattern for sending the downlink information. This is not specifically limited in this embodiment of the present invention.

In the downlink information transmission method provided in this embodiment of the present invention, a first base station originally sends downlink information by using a first period according to a first pattern; and the first base station sends the downlink information by using a second period according to the first pattern, or by using the first period according to a second pattern, or by using a second period according to a second pattern when determining to change a transmission period and/or a transmission pattern of the downlink information. The second period is less than the first period, and OFDM symbols occupied by the second pattern are more than OFDM symbols occupied by the first pattern. Different from the prior art, by using the downlink information transmission method provided in this embodiment of the present invention, a base station does not send downlink information by using a fixed period or according to a fixed pattern, but sends downlink information by using relatively many time frequency resources when determining to change a transmission period and/or a transmission pattern of the downlink information (if UE is to use a resource of the base station), so that the UE can receive the downlink information in time, and establish a wireless connection to the base station rapidly according to the downlink information. Therefore, compared with the prior art, by means of the downlink information transmission method provided in this embodiment of the present invention, it can be ensured that UE can obtain downlink information in time, and further can establish a wireless connection to a base station rapidly, thereby reducing a time for the UE to access a network, and further improving user experience.

Figure 6:
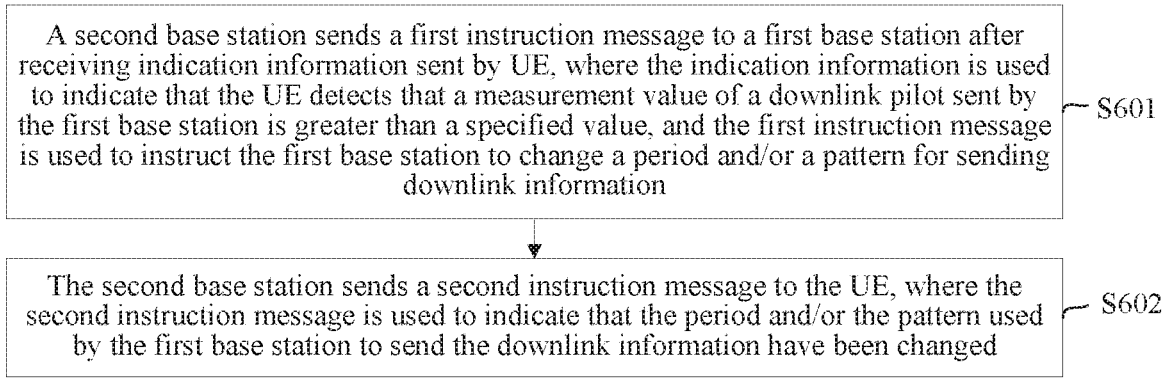
FIG. 6 is a schematic flowchart of still another downlink information transmission method according to an embodiment of the present invention.

As shown in FIG. 6, another embodiment of the present invention provides a downlink information transmission method.

S601. A second base station sends a first instruction message to a first base station after receiving indication information sent by UE, where the indication information is used to indicate that the UE detects that a measurement value of a downlink pilot sent by the first base station is greater than a specified value, and the first instruction message is used to instruct the first base station to change a period and/or a pattern for sending downlink information.

S602. The second base station sends a second instruction message to the UE, where the second instruction message is used to indicate that the period and/or the pattern used by the first base station to send the downlink information have been changed.

It should be noted that a person of ordinary skill in the art easily understands that the second base station may be specifically a user plane site or a control plane site of the UE and the first base station may be specifically one or more cells of the first base station. This is not specifically limited in this embodiment of the present invention.

The downlink information may specifically include a downlink common signal and/or a part or all of downlink common information. The downlink common signal may be specifically a cell reference signal, a synchronization signal, a discovery signal, or the like, and the downlink common information may be specifically a system broadcast message.

In a possible implementation, after receiving the indication information sent by the UE, the second base station may first send an instruction message to the UE, to notify the UE that the first base station is to change, at a particular time point, the period and/or the pattern for sending the downlink information, and then send the instruction message to the first base station, to instruct the first base station to change, at the time point, the period and/or the pattern for sending the downlink information. This is not specifically limited in this embodiment of the present invention.

Figure 7:
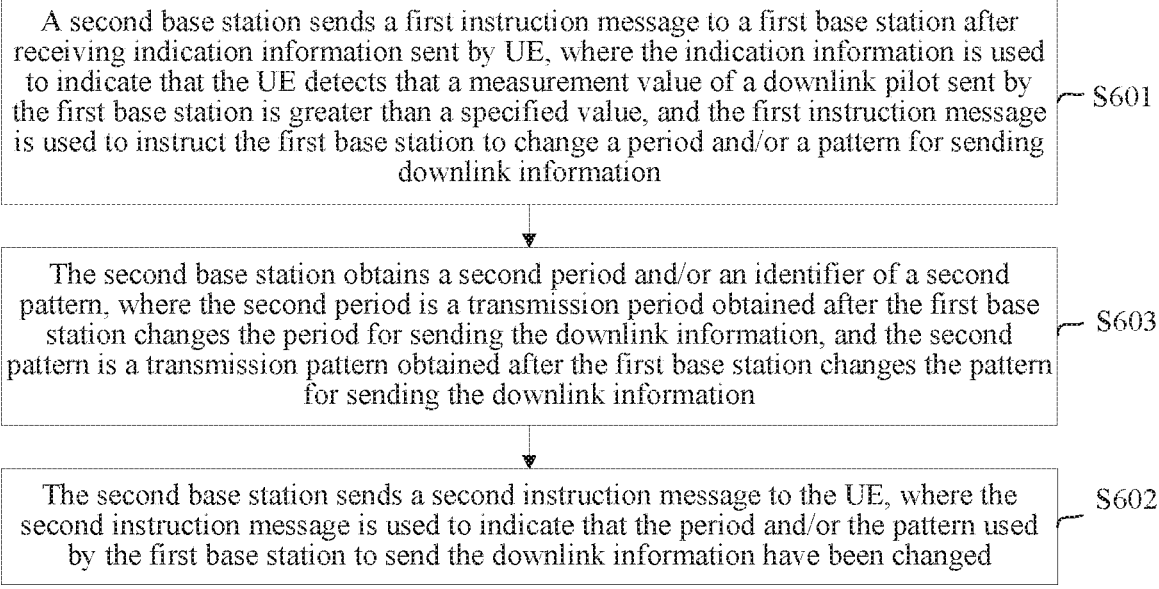
FIG. 7 is a schematic flowchart of still another downlink information transmission method according to an embodiment of the present invention.

Further, as shown in FIG. 7, after the sending, by a second base station, a first instruction message to a first base station (that is, S601), and before the sending, by the second base station, a second instruction message to the UE (that is, S602), the downlink information transmission method provided in this embodiment of the present invention may further include S603.

S603. The second base station obtains an identifier of a second period and/or an identifier of a second pattern, where the second period is a transmission period obtained after the first base station changes the period for sending the downlink information, and the second pattern is a transmission pattern obtained after the first base station changes the pattern for sending the downlink information.

That is, after the first base station receives the first instruction message and changes the period and/or the pattern for sending the downlink information, the second base station obtains the changed period and/or pattern, and notifies the UE by using the second instruction message.

Specifically, the obtaining, by the second base station, an identifier of a second period and/or an identifier of a second pattern (that is, S603) may include:

receiving, by the second base station, the identifier of the second period and/or the identifier of the second pattern that are sent by the first base station; or sending, by the second base station, a request message to the first base station, where the request message is used to request to obtain the identifier of the second period and/or the identifier of the second pattern; and receiving, by the second base station, a request response message sent by the first base station, and obtaining the identifier of the second period and/or the identifier of the second pattern according to the request response message, where the request response message carries the identifier of the second period and/or the identifier of the second pattern.

Figure 8:
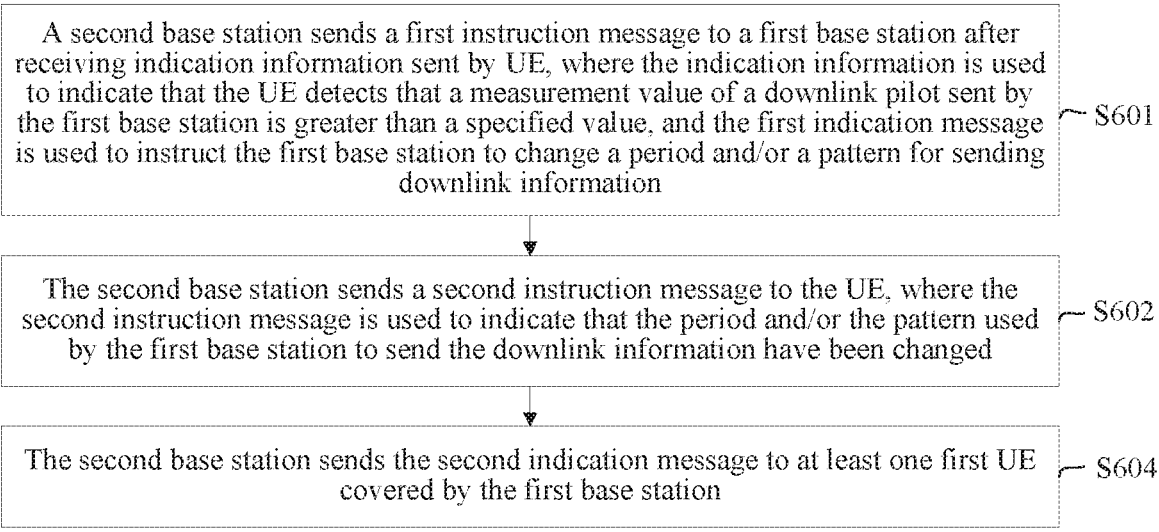
FIG. 8 is a schematic flowchart of still another downlink information transmission method according to an embodiment of the present invention.

Further, as shown in FIG. 8, after the sending, by a second base station, a first instruction message to a first base station (that is, S6012), the downlink information transmission method provided in this embodiment of the present invention may further include S604.

S604. The second base station sends the second instruction message to at least one first UE covered by the first base station.

In the downlink information transmission method provided in this embodiment of the present invention, after receiving indication information sent by UE, a second base station sends a first instruction message to a first base station, and the first base station changes a period and/or a pattern for sending downlink information. Different from the prior art, by using the downlink information transmission method provided in this embodiment of the present invention, a base station does not send downlink information by using a fixed period or according to a fixed pattern, but sends downlink information by using relatively many time frequency resources when determining to change a transmission period and/or a transmission pattern of the downlink information (if UE is to use a resource of the base station), so that the UE can receive the downlink information in time, and establish a wireless connection to the base station rapidly according to the downlink information. Therefore, compared with the prior art, by means of the downlink information transmission method provided in this embodiment of the present invention, it can be ensured that UE can obtain downlink information in time, and further can establish a wireless connection to a base station rapidly, thereby reducing a time for the UE to access a network, and further improving user experience.

Figure 9:
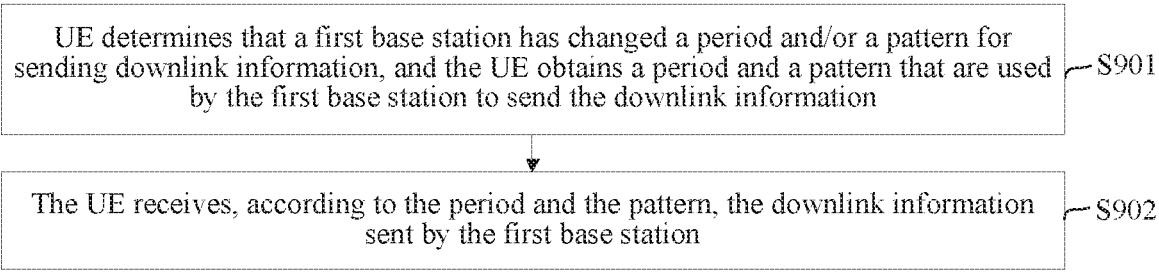
FIG. 9 is a schematic interaction diagram of a downlink information transmission method according to an embodiment of the present invention.

As shown in FIG. 9, another embodiment of the present invention provides a downlink information transmission method.

S901. UE determines that a first base station has changed a period and/or a pattern for sending downlink information, and the UE obtains a period and a pattern that are used by the first base station to send the downlink information.

S902. The UE receives, according to the period and the pattern, the downlink information sent by the first base station.

It should be noted that a person of ordinary skill in the art easily understands that the second base station may be specifically a user plane site or a control plane site of the UE and the first base station may be specifically one or more cells of the first base station. This is not specifically limited in this embodiment of the present invention.

The downlink information may specifically include a downlink common signal and/or a part or all of downlink common information. The downlink common signal may be specifically a cell reference signal, a synchronization signal, a discovery signal, or the like, and the downlink common information may be specifically a system broadcast message.

Preferably, in the downlink information transmission method provided in this embodiment of the present invention, the determining, by UE, that a first base station has changed a period and/or a pattern for sending downlink information may specifically include:

after the UE determines that a preset condition is satisfied, determining, by the UE, that the first base station has changed the period and/or the pattern for sending the downlink information.

The preset condition includes that the UE detects that a measurement value of a downlink pilot sent by the first base station is greater than a specified value, or that fingerprint information obtained by the UE matches pre-stored fingerprint information, or that geographical location information of a current location of the UE matches pre-stored geographical location information, or that the UE receives an instruction message sent by the first base station or the second base station, where the instruction message is used to indicate that the period and/or the pattern used by the first base station to send the downlink information have been changed.

Preferably, when the preset condition is that the UE detects that the measurement value of the downlink pilot sent by the first base station is greater than the specified value, or that the fingerprint information obtained by the UE matches the pre-stored fingerprint information, or that the geographical location information of the current location of the UE matches the pre-stored geographical location information, after the UE determines that the preset condition is satisfied, the downlink information transmission method provided in this embodiment of the present invention may further include: sending, by the UE, indication information to the first base station, where the indication information is used to indicate that the UE detects that the measurement value of the downlink pilot sent by the first base station is greater than the specified value, or the fingerprint information obtained by the UE matches the pre-stored fingerprint information, or the geographical location information of the current location of the UE matches the pre-stored geographical location information.

Optionally, when the preset condition is that the UE detects that the measurement value of the downlink pilot sent by the first base station is greater than the specified value, or that the fingerprint information obtained by the UE matches the pre-stored fingerprint information, or that the geographical location information of the current location of the UE matches the pre-stored geographical location information, the obtaining, by the UE, a period and a pattern that are used by the first base station to send the downlink information includes: obtaining, by the UE according to pre-stored configuration information, the period and the pattern that are used by the first base station to send the downlink information.

That is, the base station side and the UE side may pre-agree on periods and patterns obtained before and after the first base station changes the period and/or the pattern for sending the downlink information. In this way, the UE may obtain, according to the instruction message sent by the first base station and the pre-stored configuration information, the period and the pattern that are currently used by the first base station to send the downlink information. For example, assuming that the first base station has changed only the period for sending the downlink information, the UE may learn, according to the instruction message sent by the first base station, that the first base station has changed the period for sending the downlink information, and may obtain, according to the pre-stored configuration information, the changed transmission period and a transmission pattern that is obtained before the transmission period is changed.

In a possible implementation, when the preset condition is that the UE receives the instruction message sent by the first base station or the second base station, the obtaining, by the UE, a period and a pattern that are used by the first base station to send the downlink information may specifically include:

determining, by the UE, that the instruction message carries only a second period, obtaining, by the UE, the second period carried in the instruction message, and obtaining a first pattern according to pre-stored configuration information, where the second period is a transmission period obtained after the first base station changes the period for sending the downlink information, and the first pattern is a transmission pattern obtained before the first base station changes the period for sending the downlink information; and the receiving, by the UE according to the period and the pattern, the downlink information sent by the first base station may specifically includes:

receiving, by the UE according to the second period and the first pattern, the downlink information sent by the first base station.

In a possible implementation, when the preset condition is that the UE receives the instruction message sent by the first base station or the second base station, the obtaining, by the UE, a period and a pattern that are used by the first base station to send the downlink information may specifically include:

determining, by the UE, that the instruction message carries only an identifier of a second pattern, obtaining, by the UE, the second pattern according to the identifier of the second pattern, and obtaining a first period according to pre-stored configuration information, where the second pattern is a transmission pattern obtained after the first base station changes the pattern for sending the downlink information, and the first period is a transmission period obtained before the first base station changes the pattern for sending the downlink information; and the receiving, by the UE according to the period and the pattern, the downlink information sent by the first base station may specifically include:

receiving, by the UE according to the first period and the second pattern, the downlink information sent by the first base station.

In a possible implementation, when the preset condition is that the UE receives the instruction message sent by the first base station or the second base station, the obtaining, by the UE, a period and a pattern that are used by the first base station to send the downlink information may specifically include:

determining, by the UE, that the instruction message carries an identifier of a second period and an identifier of a second pattern, obtaining, by the UE, the second period and the identifier of the second pattern that are carried in the instruction message, and obtaining the second pattern according to the identifier of the second pattern, where the first period is a transmission period obtained after the first base station changes the period for sending the downlink information, and the second pattern is a transmission pattern obtained after the first base station changes the pattern for sending the downlink information; and the receiving, by the UE according to the period and the pattern, the downlink information sent by the first base station may specifically include:

receiving, by the UE according to the second period and the second pattern, the downlink information sent by the first base station.

In downlink information transmission method provided in this embodiment of the present invention, after determining that a first base station has changed a period and/or a pattern for sending downlink information, UE obtains a period and a pattern that are currently used by the first base station to send the downlink information, and receives, according to the period and the pattern, the downlink information sent by the first base station. By using the downlink information transmission method provided in this embodiment of the present invention, a base station does not send downlink information by using a fixed period or according to a fixed pattern (even though the base station sends the downlink information by using a fixed time frequency resource), but changes a period and/or a pattern for sending the downlink information, to send the downlink information by using relatively many time frequency resources. In this way, after determining that the base station has changed the period and/or the pattern for sending the downlink information, the UE can receive the downlink information in time, and establish a wireless connection to the base station rapidly according to the downlink information. Therefore, compared with the prior art, by means of the downlink information transmission method provided in this embodiment of the present invention, it can be ensured that UE can obtain downlink information in time, and further can establish a wireless connection to a base station rapidly, thereby reducing a time for the UE to access a network, and further improving user experience.

Figure 10:
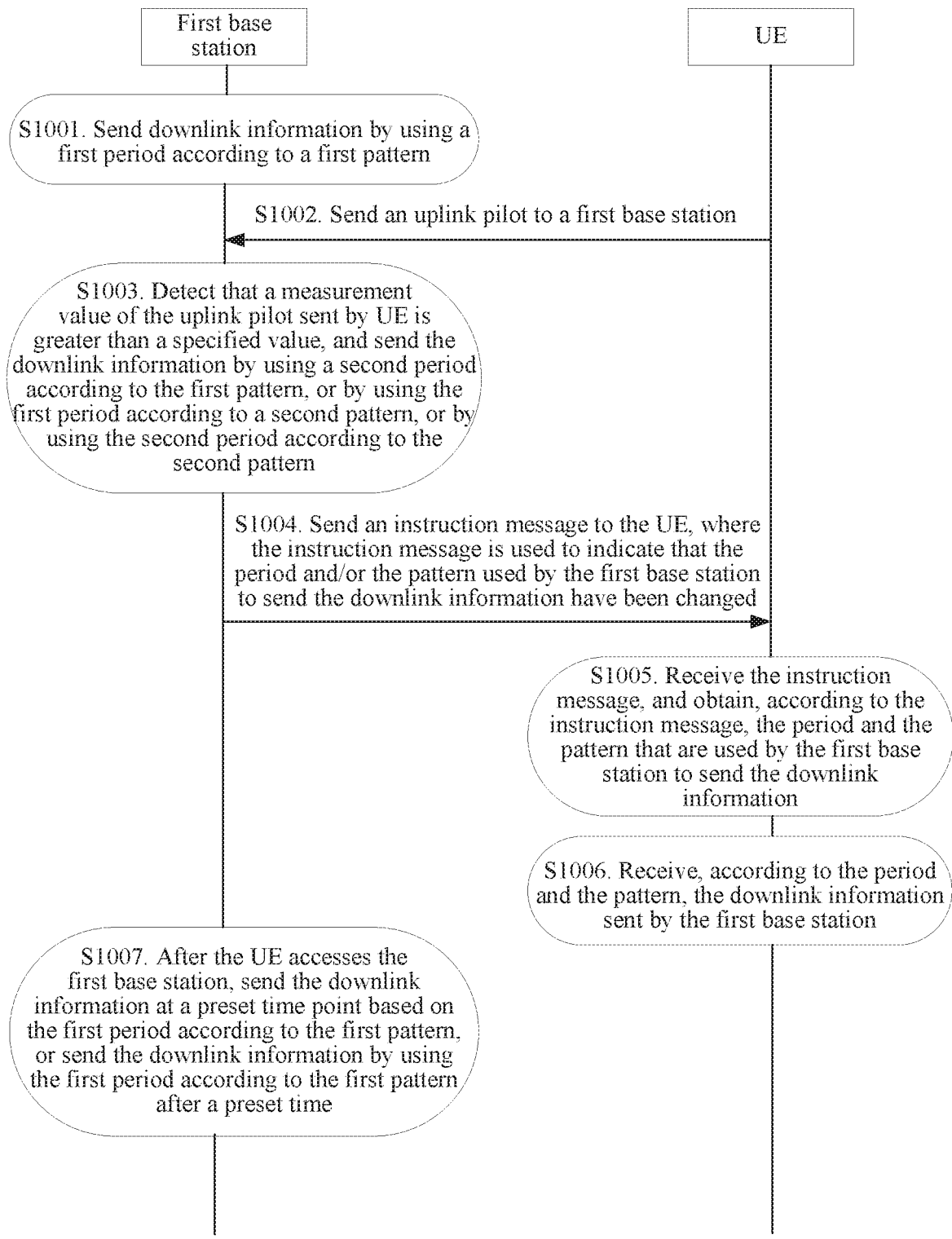
FIG. 10 is a schematic interaction diagram of another downlink information transmission method according to an embodiment of the present invention.

As shown in FIG. 10, another embodiment of the present invention provides a downlink information transmission method.

S1001. A first base station sends downlink information by using a first period according to a first pattern.

S1002. UE sends an uplink pilot to the first base station.

S1003. The first base station detects that a measurement value of the uplink pilot sent by the UE is greater than a specified value, and the first base station sends the downlink information by using a second period according to the first pattern, or by using the first period according to a second pattern, or by using a second period according to a second pattern.

The second period is less than the first period, and OFDM symbols occupied by the second pattern are more than OFDM symbols occupied by the first pattern.

S1004. The first base station sends an instruction message to the UE, where the instruction message is used to indicate that the period and/or the pattern used by the first base station to send the downlink information have been changed.

Preferably, the first base station may send, at the same time, the instruction message to another UE covered by the first base station, to notify the another UE that the period and/or the pattern used by the first base station to send the downlink information have been changed. That is, the downlink information transmission method provided in this embodiment of the present invention may further include: sending, by the first base station, the instruction message to at least one first UE covered by the first base station.

It should be noted that the base station side and the UE side may pre-agree on the period and the pattern (that is, the first period and the first pattern) that are obtained before the base station side changes the period and/or the pattern for sending the downlink information, and the base station side adds the second period and/or an identifier of the second pattern to the instruction message, to notify the UE of the changed period and/or pattern.

Further, the base station side and the UE side may further agree on the period and the pattern (that is, the second period and the second pattern) that are obtained after the base station side changes the period and/or the transmission pattern for sending the downlink information. In this case, the instruction message indicates only that the period and/or the pattern used by the base station to send the downlink information have been changed, and does not need to carry information.

Certainly, if the base station side and the UE side do not pre-agree on the first period, the first pattern, the second period, or the second pattern, the base station side may add the first period or the second period and an identifier of the first pattern or the identifier of the second pattern to the indication message, to notify the UE of the period and the pattern that are currently used by the base station to send the downlink information. This is not specifically limited in this embodiment of the present invention.

In addition, it should be further noted that, if the first base station has changed, at the same time, a start location for sending the downlink information, the first base station needs to notify the UE of the changed start location.

S1005. The UE receives the instruction message, and obtains, according to the instruction message, the period and the pattern that are used by the first base station to send the downlink information.

Specifically, if the base station side and the UE side pre-agree on the first period and the first pattern, but do not agree on the second period or the second pattern, the obtaining, according to the instruction message, the period and the pattern that are used by the first base station to send the downlink information may specifically include:

determining, by the UE, that the instruction message carries only the second period, obtaining, by the UE, the second period carried in the instruction message, and obtaining the first pattern according to pre-stored configuration information; or determining, by the UE, that the instruction message carries only the identifier of the second pattern, obtaining, by the UE, the second pattern according to the identifier of the second pattern, and obtaining the first period according to pre-stored configuration information; or determining, by the UE, that the instruction message carries the second period and the identifier of the second pattern, obtaining, by the UE, the second period and the identifier of the second pattern that are carried in the instruction message, and obtaining the second pattern according to the identifier of the second pattern.

If the base station side and the UE side pre-agree on the first period, the first pattern, the second period, and the second pattern, the UE may learn, according to the instruction message sent by the first base station, that the first base station has specifically changed the period and/or the pattern for sending the downlink information, and further obtain, according to the pre-stored configuration information, the period and the pattern that are currently used by the first base station to send the downlink information. For example, assuming that the first base station has changed only the period for sending the downlink information, the UE may learn, according to the instruction message sent by the first base station, that the first base station has changed the period for sending the downlink information, and further may obtain, according to the pre-stored configuration information, the changed transmission period (that is, the second period) and a transmission pattern (that is, the first pattern) that is obtained before the transmission period is changed.

If the base station side and the UE side do not pre-agree on the first period, the first pattern, the second period, or the second pattern, the UE may obtain, according to related information carried in the indication message, the period and the pattern that are currently used by the first base station to send the downlink information. This is not specifically limited in this embodiment of the present invention. For example, assuming that the first base station has changed only the period for sending the downlink information, the first base station sends an instruction message that carries the second period and the identifier of the first pattern to the UE, and after receiving the instruction message, the UE may obtain the period and the pattern that are currently used by the first base station to send the downlink information.

S1006. The UE receives, according to the period and the pattern, the downlink information sent by the first base station.

S1007. After the UE accesses the first base station, the first base station sends the downlink information at a preset time point by using the first period according to the first pattern, or sends the downlink information by using the first period according to the first pattern after a preset time.

By using the downlink information transmission method provided in this embodiment of the present invention, in one aspect, different from the prior art, a base station does not send downlink information by using a fixed period or according to a fixed pattern (even though the base station sends the downlink information by using a fixed time frequency resource), but changes a period and/or a pattern for sending the downlink information, to send the downlink information by using relatively many time frequency resources. In this way, after determining that the base station has changed the period and/or the pattern for sending the downlink information, the UE can receive the downlink information in time, and establish a wireless connection to the base station rapidly according to the downlink information. Therefore, compared with the prior art, by means of the downlink information transmission method provided in this embodiment of the present invention, it can be ensured that UE can obtain downlink information in time, and further can establish a wireless connection to a base station rapidly, thereby reducing a time for the UE to access a network, and further improving user experience. In another aspect, in the downlink information transmission method provided in this embodiment of the present invention, after the UE accesses the base station or after a period of time, the base station sends the downlink information by using a relatively few time frequency resources, so that overheads of downlink information sending can be reduced, more time frequency resources are used to send data, and further, a downlink capacity and downlink resource utilization are improved. Therefore, compared with the prior art, by means of the downlink information transmission method provided in this embodiment of the present invention, overheads used by a base station to send downlink information can be reduced, a downlink capacity can be improved, and further downlink resource utilization can be improved.

In conclusion, compared with the prior art, by means of the downlink information transmission method provided in this embodiment of the present invention, it can be ensured that UE can obtain downlink information in time, and further can establish a wireless connection to a base station rapidly, thereby reducing a time for the UE to access a network, and further improving user experience. At the same time, overheads used by the base station to send the downlink information can be reduced, a downlink capacity can be improved, and downlink resource utilization can be improved.

Figure 11A:
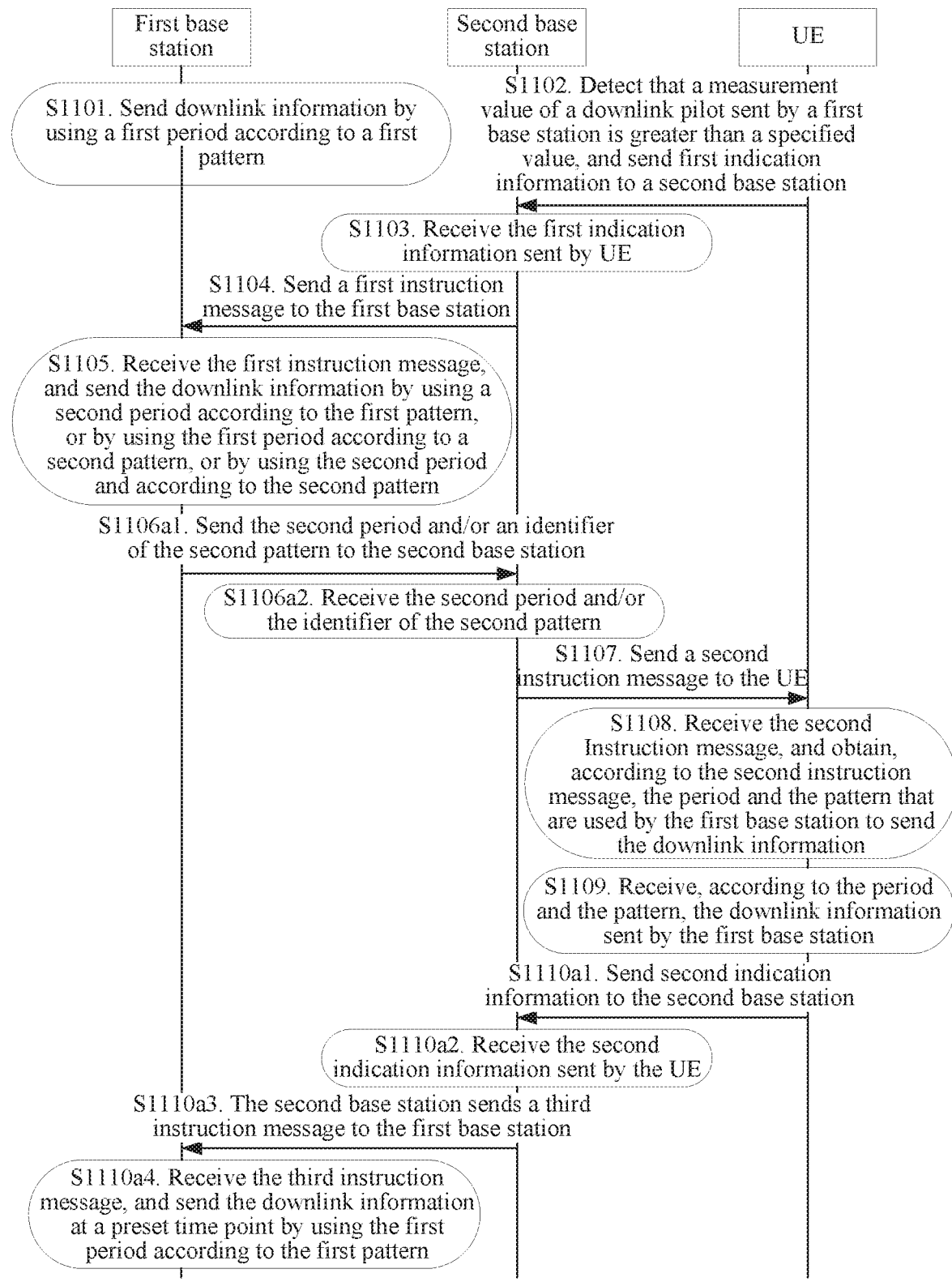
FIG. 11(a) is a schematic interaction diagram of still another downlink information transmission method according to an embodiment of the present invention.

As shown in FIG. 11(a), another embodiment of the present invention provides a downlink information transmission method.

S1101. A first base station sends downlink information by using a first period according to a first pattern.

S1102. UE detects that a measurement value of a downlink pilot sent by the first base station is greater than a specified value, and sends first indication information to a second base station.

The first indication information is used to indicate that the UE detects that the measurement value of the downlink pilot sent by the first base station is greater than the specified value.

S1103. The second base station receives the first indication information sent by the UE.

The second base station may be specifically a control plane site or a user plane site of the UE. This is not specifically limited in this embodiment of the present invention.

S1104. The second base station sends a first instruction message to the first base station.

The first instruction message is used to instruct the first base station to change a period and/or a pattern for sending the downlink information.

S1105. The first base station receives the first instruction message, and sends the downlink information by using a second period according to the first pattern, or by using the first period according to a second pattern, or by using the second period and according to the second pattern.

S1106a1. The first base station sends an identifier of the second period and/or an identifier of the second pattern to the second base station.

S1106a2. The second base station receives the identifier of the second period and/or the identifier of the second pattern.

S1107. The second base station sends a second instruction message to the UE.

The second instruction message is used to indicate that the period and/or the pattern used by the first base station to send the downlink information have been changed, and the second instruction message carries the identifier of the second period and/or the identifier of the second pattern.

Preferably, the second base station may send, at the same time, the instruction message to another UE covered by the first base station, to notify the another UE that the period and/or the pattern used by the first base station to send the downlink information have been changed. That is, the downlink information transmission method provided in this embodiment of the present invention may further include: sending, by the second base station, the instruction message to at least one first UE covered by the first base station.

S1108. The UE receives the second instruction message, and obtains, according to the second instruction message, the period and the pattern that are used by the first base station to send the downlink information.

Specifically, for a process in which the UE obtains, according to the second instruction message, the period and the pattern that are used by the first base station to send the downlink information, refer to related descriptions in the previous embodiment of the present invention, and details are not described in this embodiment of the present invention again.

S1109. The UE receives, according to the period and the pattern, the downlink information sent by the first base station.

S1110a1. The UE sends second indication information to the second base station.

The second indication information is used to indicate that the UE already accesses the first base station.

S1110a2. The second base station receives the second indication information sent by the UE.

S1110a3. The second base station sends a third instruction message to the first base station.

The third instruction message is used to instruct the first base station to send the downlink information at a preset time point by using the first period according to the first pattern.

S1110a4. The first base station receives the third instruction message, and sends the downlink information at a preset time point by using the first period according to the first pattern.

Figure 11B:
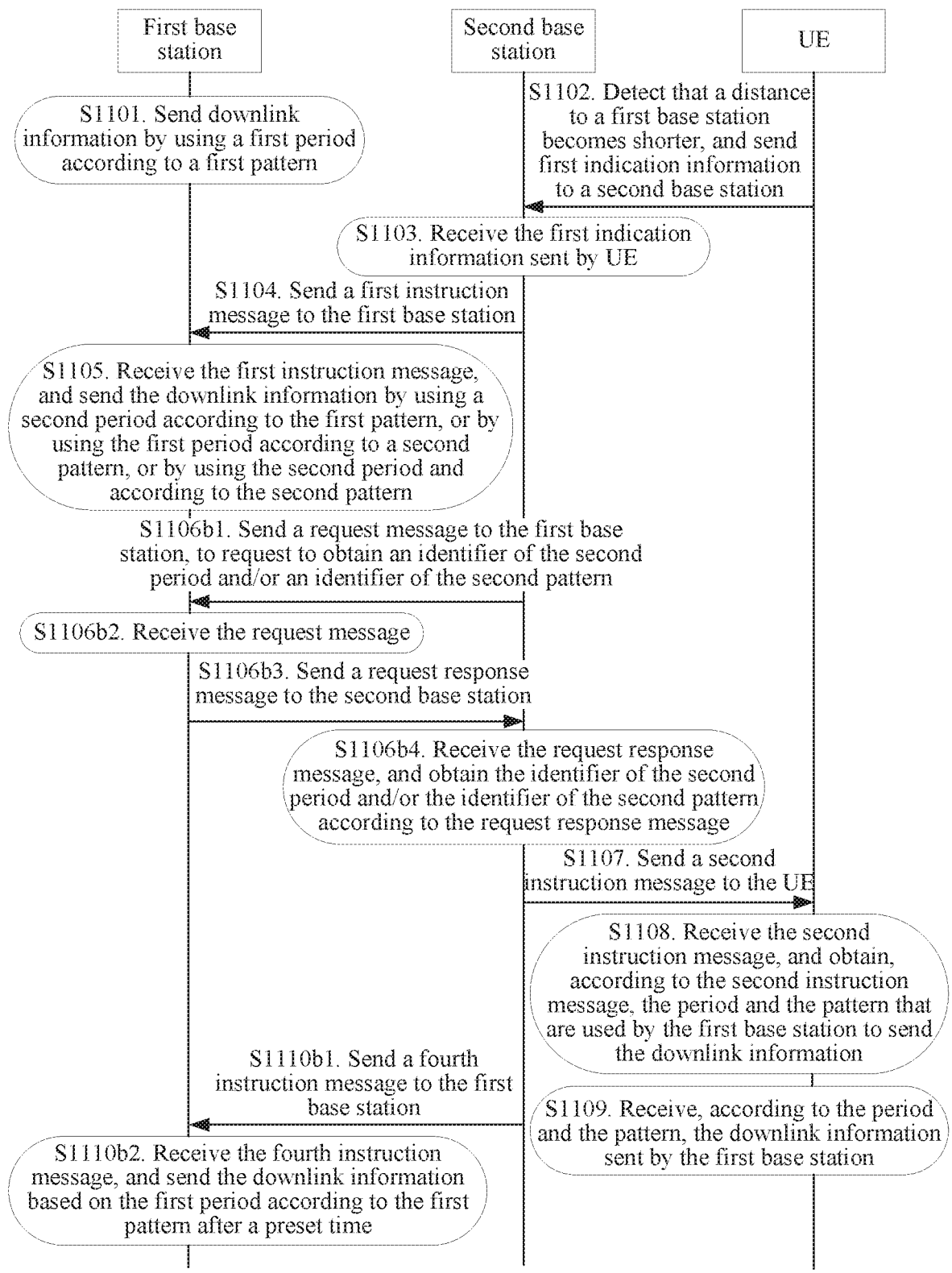
FIG. 11(b) is a schematic interaction diagram of still another downlink information transmission method according to an embodiment of the present invention.

Alternatively, as shown in FIG. 11(b), after step S1105, and before step S1107, the method includes S1106b1 to S1106b4.

S1106b1. The second base station sends a request message to the first base station.

The request message is used to request to obtain the identifier of the second period and/or the identifier of the second pattern.

S1106b2. The first base station receives the request message.

S1106b3. The first base station sends a request response message to the second base station.

The request response message carries the identifier of the second period and/or the identifier of the second pattern.

S1106b4. The second base station receives the request response message, and obtains the second period and/or an identifier of the second pattern according to the request response message.

Alternatively, as shown in FIG. 11(b), after step S1109, the method includes S1110b1 and S1110b2.

S1110b1. The second base station sends a fourth instruction message to the first base station.

The fourth instruction message is used to instruct the first base station to send the downlink information by using the first period according to the first pattern after a preset time.

S1110b2. The first base station receives the fourth instruction message, and sends the downlink information by using the first period according to the first pattern after a preset time.

By using the downlink information transmission method provided in this embodiment of the present invention, in one aspect, different from the prior art, a base station does not send downlink information by using a fixed period or according to a fixed pattern (even though the base station sends the downlink information by using a fixed time frequency resource), but changes a period and/or a pattern for sending the downlink information, to send the downlink information by using relatively many time frequency resources. In this way, after determining that the base station has changed the period and/or the pattern for sending the downlink information, the UE can receive the downlink information in time, and establish a wireless connection to the base station rapidly according to the downlink information. Therefore, compared with the prior art, by means of the downlink information transmission method provided in this embodiment of the present invention, it can be ensured that UE can obtain downlink information in time, and further can establish a wireless connection to a base station rapidly, thereby reducing a time for the UE to access a network, and further improving user experience. In another aspect, in the downlink information transmission method provided in this embodiment of the present invention, after the UE accesses the base station or after a period of time, the base station sends the downlink information by using a relatively few time frequency resources, so that overheads of downlink information sending can be reduced, more time frequency resources are used to send data, and further, a downlink capacity and downlink resource utilization are improved. Therefore, compared with the prior art, by means of the downlink information transmission method provided in this embodiment of the present invention, overheads used by a base station to send downlink information can be reduced, a downlink capacity can be improved, and further downlink resource utilization can be improved.

In conclusion, compared with the prior art, by means of the downlink information transmission method provided in this embodiment of the present invention, it can be ensured that UE can obtain downlink information in time, and further can establish a wireless connection to a base station rapidly, thereby reducing a time for the UE to access a network, and further improving user experience. At the same time, overheads used by the base station to send the downlink information can be reduced, a downlink capacity can be improved, and downlink resource utilization can be improved.

Figure 12:
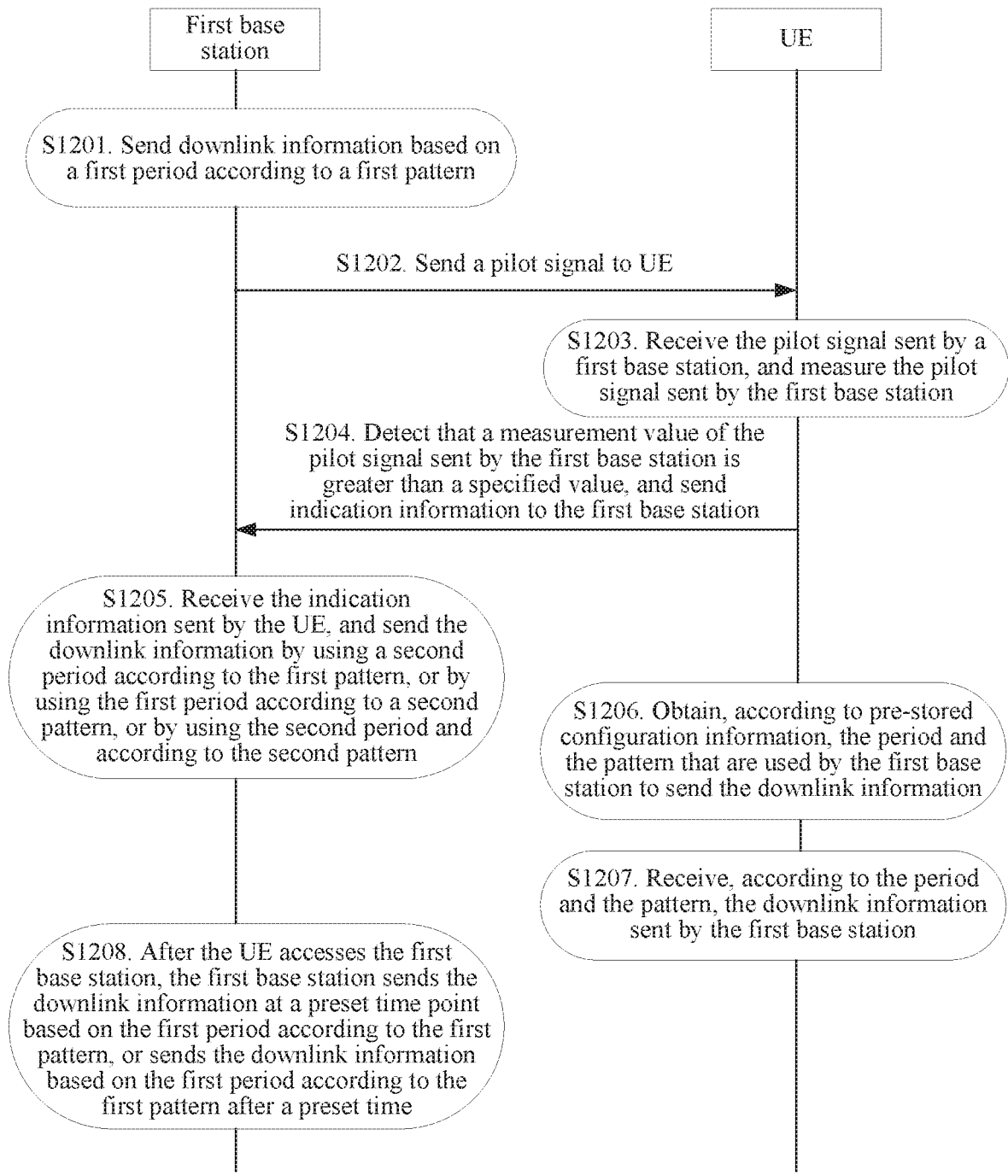
FIG. 12 is a schematic interaction diagram of still another downlink information transmission method according to an embodiment of the present invention.

As shown in FIG. 12, another embodiment of the present invention provides a downlink information transmission method.

S1201. A first base station sends downlink information by using a first period according to a first pattern.

S1202. The first base station sends a pilot signal to UE.

S1203. The UE receives the pilot signal sent by the first base station, and measures the pilot signal sent by the first base station.

S1204. The UE detects that a measurement value of the pilot signal sent by the first base station is greater than a specified value, and the UE sends indication information to the first base station.

The indication information is used to indicate that the UE detects that the measurement value of the pilot signal sent by the first base station is greater than the specified value. The measurement value may be specifically signal strength, signal quality, or a CQI. This is not specifically limited in this embodiment of the present invention.

S1205. The first base station receives the indication information sent by the UE, and sends the downlink information by using a second period according to the first pattern, or by using the first period according to a second pattern, or by using the second period and according to the second pattern.

The second period is less than the first period, and OFDM symbols occupied by the second pattern are more than OFDM symbols occupied by the first pattern.

S1206. The UE obtains, according to pre-stored configuration information, the period and the pattern that are used by the first base station to send the downlink information.

That is, after detecting that the measurement value of the pilot signal sent by the first base station is greater than the specified value, and sending the indication information to the first base station, the UE considers that the first base station has changed the period and/or the pattern for sending the downlink information, and obtains, according to pre-stored configuration information, the period and/or the pattern that are currently used by the first base station to send the downlink information.

Specifically, the base station side and the UE side may pre-agree on that the base station side changes only the period for sending the downlink information, or the base station side changes only the pattern for sending the downlink information, or the base station side changes both the period and the pattern for sending the downlink information and the base station side and the UE side agree on the changed period and pattern that are used by the base station side to send the downlink information. In this way, the UE may learn, according to the pre-stored configuration information, the period and the pattern that are currently used by the base station to send the downlink information.

S1207. The UE receives, according to the period and the pattern, the downlink information sent by the first base station.

S1208. After the UE accesses the first base station, the first base station sends the downlink information at a preset time point by using the first period according to the first pattern, or sends the downlink information by using the first period according to the first pattern after a preset time.

By using the downlink information transmission method provided in this embodiment of the present invention, in one aspect, different from the prior art, a base station does not send downlink information by using a fixed period or according to a fixed pattern (even though the base station sends the downlink information by using a fixed time frequency resource), but changes a period and/or a pattern for sending the downlink information, to send the downlink information by using relatively many time frequency resources. In this way, after determining that the base station has changed the period and/or the pattern for sending the downlink information, the UE can receive the downlink information in time, and establish a wireless connection to the base station rapidly according to the downlink information. Therefore, compared with the prior art, by means of the downlink information transmission method provided in this embodiment of the present invention, it can be ensured that UE can obtain downlink information in time, and further can establish a wireless connection to a base station rapidly, thereby reducing a time for the UE to access a network, and further improving user experience. In another aspect, in the downlink information transmission method provided in this embodiment of the present invention, after the UE accesses the base station or after a period of time, the base station sends the downlink information by using a relatively few time frequency resources, so that overheads of downlink information sending can be reduced, more time frequency resources are used to send data, and further, a downlink capacity and downlink resource utilization are improved. Therefore, compared with the prior art, by means of the downlink information transmission method provided in this embodiment of the present invention, overheads used by a base station to send downlink information can be reduced, a downlink capacity can be improved, and further downlink resource utilization can be improved.

In conclusion, compared with the prior art, by means of the downlink information transmission method provided in this embodiment of the present invention, it can be ensured that UE can obtain downlink information in time, and further can establish a wireless connection to a base station rapidly, thereby reducing a time for the UE to access a network, and further improving user experience. At the same time, overheads used by the base station to send the downlink information can be reduced, a downlink capacity can be improved, and downlink resource utilization can be improved.

Figure 13:
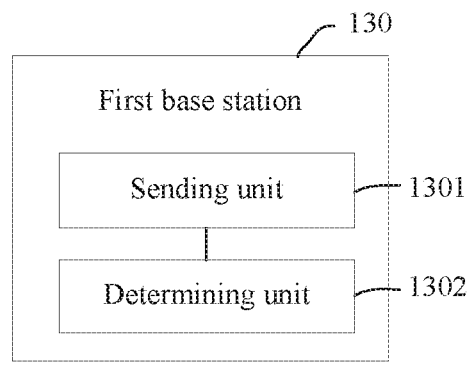
FIG. 13 is a schematic structural diagram of a first base station according to an embodiment of the present invention.

As shown in FIG. 13, another embodiment of the present invention provides a first base station 130, including a sending unit 1301 and a determining unit 1302.

The sending unit 1301 is configured to send downlink information by using a first period according to a first pattern.

The determining unit 1302 is configured to determine to change a transmission period and/or a transmission pattern of the downlink information.

The sending unit 1301 is further configured to send the downlink information by using a second period according to the first pattern, or by using the first period according to a second pattern, or by using a second period according to a second pattern when the determining unit 1302 determines to change the transmission period and/or the transmission pattern of the downlink information.

The second period is less than the first period, and OFDM symbols occupied by the second pattern are more than OFDM symbols occupied by the first pattern.

Specifically, the downlink information may include a downlink common signal and/or a part or all of downlink common information.

Figure 14:
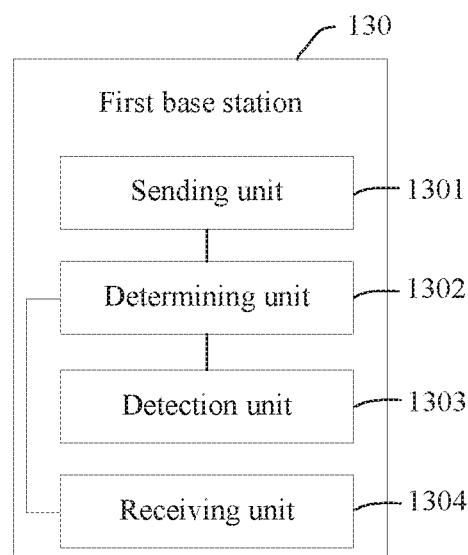
FIG. 14 is a schematic structural diagram of another first base station according to an embodiment of the present invention.

Further, as shown in FIG. 14, the first base station 130 provided in this embodiment of the present invention may further include a detection unit 1303 and a receiving unit 1304.

The detection unit 1303 is configured to detect whether a measurement value of an uplink pilot sent by UE is greater than a specified value.

The receiving unit 1304 is configured to receive a proximity instruction message, an access sequence, or a scheduling request signal that are sent by the UE.

The receiving unit 1304 is further configured to receive a first instruction message sent by a second base station, where the first instruction message is used to instruct the first base station 130 to change the transmission period and/or the transmission pattern of the downlink information.

The determining unit 1302 is specifically configured to: after determining that a preset condition is satisfied, determine to change the transmission period and/or the transmission pattern of the downlink information, where the preset condition includes that the detection unit 1303 detects that the measurement value of the uplink pilot sent by the UE is greater than the specified value, or that the receiving unit 1304 receives the proximity instruction message, the access sequence, or the scheduling request signal sent by the UE, or that the receiving unit 1304 receives the first instruction message sent by the second base station.

Preferably, in the first base station 130 provided in this embodiment of the present invention, the sending unit 1301 is further configured to: after sending the downlink information, after the UE accesses the first base station 130, send the downlink information at a preset time point by using the first period according to the first pattern, or send the downlink information by using the first period according to the first pattern after a preset time.

Preferably, in the first base station 130 provided in this embodiment of the present invention, the sending unit 1301 is further configured to: when the preset condition is that the receiving unit 1304 receives the first instruction message sent by the second base station, after the sending unit 1301 sends the downlink information, send an identifier of the second period and/or an identifier of the second pattern to the second base station; or the receiving unit 1304 is further configured to: when the preset condition is that the receiving unit 1304 receives the first instruction message sent by the second base station, after the sending unit 1301 sends the downlink information, receive a request message sent by the second base station, where the request message is used to request to obtain an identifier of the second period and/or an identifier of the second pattern; and the sending unit 1301 is further configured to send a request response message to the second base station, where the request response message carries the identifier of the second period and/or the identifier of the second pattern.

Preferably, in the first base station 130 provided in this embodiment of the present invention, the sending unit 1301 is further configured to: when the preset condition is that the detection unit 1303 detects that the measurement value of the uplink pilot sent by the UE is greater than the specified value, or that the receiving unit 1304 receives the proximity instruction message, the access sequence, or the scheduling request signal sent by the UE, after sending the downlink information, send a second instruction message to the UE, where the second instruction message is used to indicate that the period and/or the pattern used by the first base station 130 to send the downlink information have been changed.

Optionally, in the first base station 130 provided in this embodiment of the present invention, the second instruction message carries an identifier of the second period and/or an identifier of the second pattern.

Optionally, in the first base station 130 provided in this embodiment of the present invention, the sending unit 1301 is further configured to: after sending the downlink information, send the second instruction message to at least one first UE covered by the first base station 130.

Different from the prior art, by using the first base station provided in this embodiment of the present invention, the first base station does not send downlink information by using a fixed period or according to a fixed pattern, but sends downlink information by using relatively many time frequency resources when determining to change a transmission period and/or a transmission pattern of the downlink information (if UE is to use a resource of the first base station), so that the UE can receive the downlink information in time, and establish a wireless connection to the first base station rapidly according to the downlink information. Therefore, compared with the prior art, by means of the first base station provided in this embodiment of the present invention, it can be ensured that UE can obtain downlink information in time, and further can establish a wireless connection to a base station rapidly, thereby reducing a time for the UE to access a network, and further improving user experience.

Figure 15:
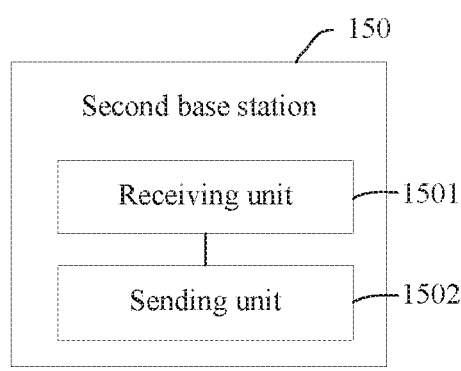
FIG. 15 is a schematic structural diagram of a second base station according to an embodiment of the present invention.

As shown in FIG. 15, another embodiment of the present invention provides a second base station 150, including a receiving unit 1501 and a sending unit 1502.

The receiving unit 1501 is configured to receive indication information sent by UE, where the indication information is used to indicate that the UE detects that a measurement value of a downlink pilot sent by a first base station is greater than a specified value.

The sending unit 1502 is configured to: after the receiving unit 1501 receives the indication information sent by the UE, send a first instruction message to the first base station, where the first instruction message is used to instruct the first base station to change a period and/or a pattern for sending downlink information.

The sending unit 1502 is further configured to send a second instruction message to the UE, where the second instruction message is used to indicate that the period and/or the pattern used by the first base station to send the downlink information have been changed.

The downlink information may specifically include a downlink common signal and/or a part or all of downlink common information.

Figure 16:
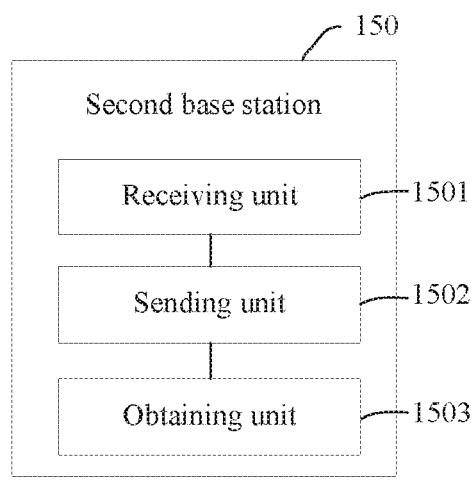
FIG. 16 is a schematic structural diagram of another second base station according to an embodiment of the present invention.

Further, as shown in FIG. 16, the second base station 150 provided in this embodiment of the present invention may further include an obtaining unit 1503.

The obtaining unit 1503 is configured to: after the sending unit 1502 sends the first instruction message to the first base station, before the sending unit 1502 sends the second instruction message to the UE, obtain an identifier of a second period and/or an identifier of a second pattern, where the second period is a transmission period obtained after the first base station changes the period for sending the downlink information, and the second pattern is a transmission pattern obtained after the first base station changes the pattern for sending the downlink information.

Preferably, in the second base station 150 provided in this embodiment of the present invention, the obtaining unit 1503 is specifically configured to: receive the identifier of the second period and/or the identifier of the second pattern that are sent by the first base station; or send a request message to the first base station, where the request message is used to request to obtain the identifier of the second period and/or the identifier of the second pattern; and receive a request response message sent by the first base station, and obtain the identifier of the second period and/or the identifier of the second pattern according to the request response message, where the request response message carries the identifier of the second period and/or the identifier of the second pattern.

Preferably, in the second base station 150 provided in this embodiment of the present invention, the sending unit 1502 is further configured to: after sending the first instruction message to the first base station, send the second instruction message to at least one first UE covered by the first base station.

In this embodiment of the present invention, after receiving indication information sent by UE, the second base station sends a first instruction message to a first base station, to instruct the first base station to change a period and/or a pattern for sending downlink information. In this way, after receiving the instruction message sent by the second base station, the first base station may determine that the transmission period and/or the transmission pattern of the downlink information need to be changed, further change the transmission period and/or the transmission pattern of the downlink information, and send the downlink information by using relatively many time frequency resources, so that the UE can receive the downlink information in time and establish a wireless connection to the first base station rapidly according to the downlink information. Therefore, compared with the prior art, by means of the second base station provided in this embodiment of the present invention, it can be ensured that UE can obtain downlink information in time, and further can establish a wireless connection to a first base station rapidly, thereby reducing a time for the UE to access a network, and further improving user experience.

Figure 17:
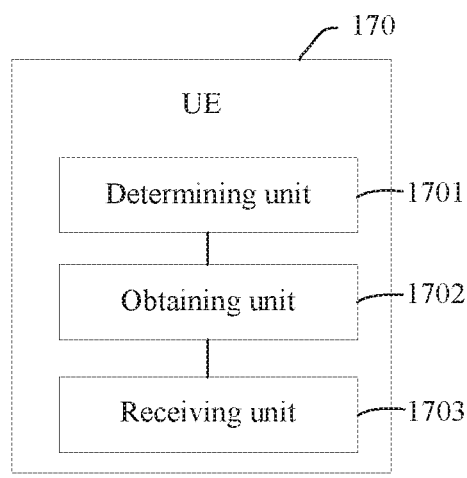
FIG. 17 is a schematic structural diagram of UE according to an embodiment of the present invention.

As shown in FIG. 17, another embodiment of the present invention provides UE 170, including a determining unit 1701, an obtaining unit 1702, and a receiving unit 1703.

The determining unit 1701 is configured to determine that a first base station has changed a period and/or a pattern for sending downlink information.

The obtaining unit 1702 is configured to obtain a period and a pattern that are used by the first base station to send the downlink information.

The receiving unit 1703 is configured to receive, according to the period and the pattern, the downlink information sent by the first base station.

The downlink information may specifically include a downlink common signal and/or a part or all of downlink common information.

Figure 18:
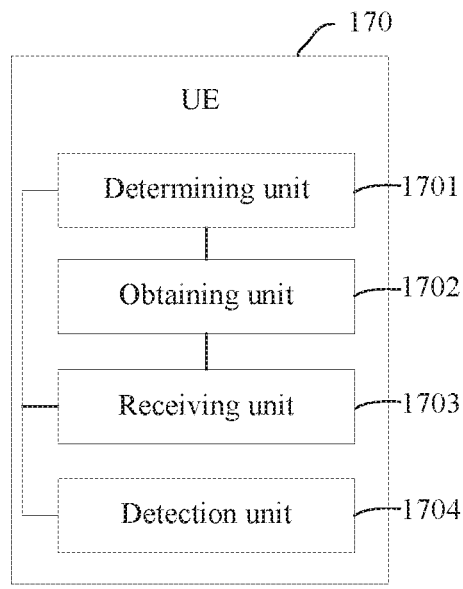
FIG. 18 is a schematic structural diagram of another UE according to an embodiment of the present invention.

Further, as shown in FIG. 18, the UE 170 provided in this embodiment of the present invention may further include a detection unit 1704.

The detection unit 1704 is configured to detect whether a measurement value of a downlink pilot sent by the first base station is greater than a specified value, whether fingerprint information obtained by the UE 170 matches pre-stored fingerprint information, and whether geographical location information of a current location of the UE 170 matches pre-stored geographical location information.

The receiving unit 1703 is further configured to receive an instruction message sent by the first base station or a second base station, where the instruction message is used to indicate that the period and/or the pattern used by the first base station to send the downlink information have been changed.

The determining unit 1701 is specifically configured to: after determining that a preset condition is satisfied, determine that the first base station has changed the period and/or the pattern for sending the downlink information, where the preset condition includes that the detection unit 1704 detects that the measurement value of the downlink pilot sent by the first base station is greater than the specified value, or that the fingerprint information obtained by the UE 170 matches the pre-stored fingerprint information, or that the geographical location information of the current location of the UE 170 matches the pre-stored geographical location information, or that the receiving unit 1703 receives the instruction message sent by the first base station or the second base station.

Figure 19:
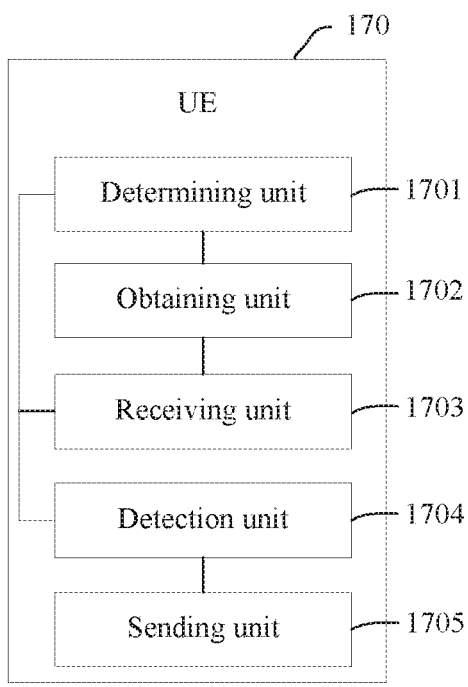
FIG. 19 is a schematic structural diagram of still another UE according to an embodiment of the present invention.

Further, as shown in FIG. 19, the UE 170 provided in this embodiment of the present invention may further include a sending unit 1705.

The sending unit 1705 is configured to: when the preset condition is that the detection unit 1704 detects that the measurement value of the downlink pilot sent by the first base station is greater than the specified value, or that the fingerprint information obtained by the UE 170 matches the pre-stored fingerprint information, or that the geographical location information of the current location of the UE 170 matches the pre-stored geographical location information, after the determining unit 1701 determines that the preset condition is satisfied, send indication information to the first base station, where the indication information is used to indicate that the detection unit 1704 detects that the measurement value of the downlink pilot sent by the first base station is greater than the specified value, or the fingerprint information obtained by the UE 170 matches the pre-stored fingerprint information, or the geographical location information of the current location of the UE 170 matches the pre-stored geographical location information.

Preferably, in the UE 170 provided in this embodiment of the present invention, the obtaining unit 1702 is specifically configured to: when the preset condition is that the detection unit 1704 detects that the measurement value of the downlink pilot sent by the first base station is greater than the specified value, or that the fingerprint information obtained by the UE 170 matches the pre-stored fingerprint information, or that the geographical location information of the current location of the UE 170 matches the pre-stored geographical location information, obtain, according to pre-stored configuration information, the period and the pattern that are used by the first base station to send the downlink information.

In a possible implementation, in the UE 170 provided in this embodiment of the present invention, the obtaining unit 1702 is specifically configured to: when the preset condition is that the receiving unit 1703 receives the instruction message sent by the first base station or the second base station, determine that the instruction message carries only a second period, obtain the second period carried in the instruction message, and obtain a first pattern according to pre-stored configuration information, where the second period is a transmission period obtained after the first base station changes the period for sending the downlink information, and the first pattern is a transmission pattern obtained before the first base station changes the period for sending the downlink information; and the receiving unit 1703 is specifically configured to receive, according to the second period and the first pattern, the downlink information sent by the first base station.

In a possible implementation, in the UE 170 provided in this embodiment of the present invention, the obtaining unit 1702 is specifically configured to: when the preset condition is that the receiving unit 1703 receives the instruction message sent by the first base station or the second base station, determine that the instruction message carries only an identifier of a second pattern, obtain the second pattern according to the identifier of the second pattern, and obtain a first period according to pre-stored configuration information, where the second pattern is a transmission pattern obtained after the first base station changes the pattern for sending the downlink information, and the first period is a transmission period obtained before the first base station changes the pattern for sending the downlink information; and the receiving unit 1703 is specifically configured to receive, according to the first period and the second pattern, the downlink information sent by the first base station.

In a possible implementation, in the UE 170 provided in this embodiment of the present invention, the obtaining unit 1702 is specifically configured to: when the preset condition is that the receiving unit 1703 receives the instruction message sent by the first base station or the second base station, determine that the instruction message carries an identifier of a second period and an identifier of a second pattern, obtain the identifier of the second period and the identifier of the second pattern that are carried in the instruction message, and obtain the second pattern according to the identifier of the second pattern, where the first period is a transmission period obtained after the first base station changes the period for sending the downlink information, and the second pattern is a transmission pattern obtained after the first base station changes the pattern for sending the downlink information; and the receiving unit 1703 is specifically configured to receive, according to the second period and the second pattern, the downlink information sent by the first base station.

After determining that a first base station has changed a period and/or a pattern for sending downlink information, the UE provided in this embodiment of the present invention obtains a period and a pattern that are currently used by the first base station to send the downlink information, and receives, according to the period and the pattern, the downlink information sent by the first base station. Therefore, by using the UE provided in this embodiment of the present invention, a base station does not send downlink information by using a fixed period or according to a fixed pattern (even though the base station sends the downlink information by using a fixed time frequency resource), but changes a period and/or a pattern for sending the downlink information, to send the downlink information by using relatively many time frequency resources. In this way, after determining that the base station has changed the period and/or the pattern for sending the downlink information, the UE can receive the downlink information in time, and establish a wireless connection to the base station rapidly according to the downlink information. Therefore, compared with the prior art, by means of the UE provided in this embodiment of the present invention, it can be ensured that the UE can obtain downlink information in time, and further can establish a wireless connection to a base station rapidly, thereby reducing a time for the UE to access a network, and further improving user experience.

Figure 20:
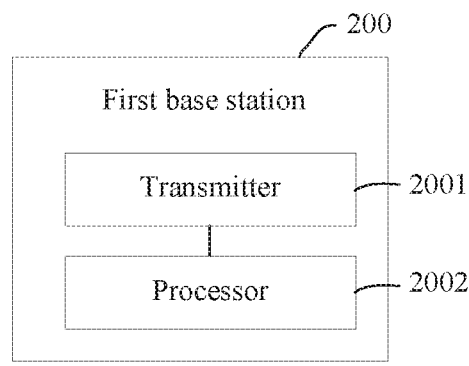
FIG. 20 is a schematic structural diagram of a first base station according to an embodiment of the present invention.

As shown in FIG. 20, another embodiment of the present invention provides a first base station 200, including a transmitter 2001 and a processor 2002.

The transmitter 2001 is configured to send downlink information by using a first period according to a first pattern.

The processor 2002 is configured to determine to change a transmission period and/or a transmission pattern of the downlink information.

The transmitter 2001 is further configured to send the downlink information by using a second period according to the first pattern, or by using the first period according to a second pattern, or by using a second period according to a second pattern when the processor 2002 determines to change the transmission period and/or the transmission pattern of the downlink information.

The second period is less than the first period, and OFDM symbols occupied by the second pattern are more than OFDM symbols occupied by the first pattern.

The downlink information may specifically include a downlink common signal and/or a part or all of downlink common information.

Figure 21:
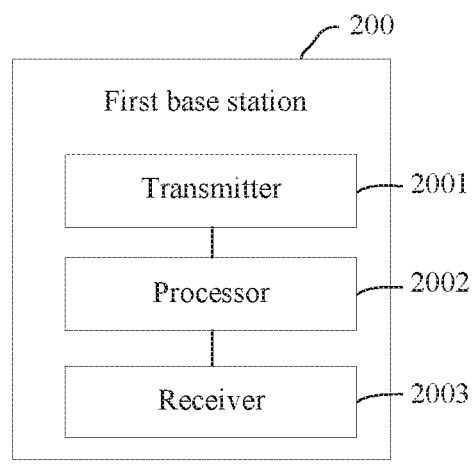
FIG. 21 is a schematic structural diagram of another first base station according to an embodiment of the present invention.

Further, as shown in FIG. 21, the first base station 200 provided in this embodiment of the present invention may further include a receiver 2003.

The processor 2002 is further configured to detect whether a measurement value of an uplink pilot sent by UE is greater than a specified value.

The receiver 2003 is configured to receive a proximity instruction message, an access sequence, or a scheduling request signal that are sent by the UE.

The receiver 2003 is further configured to receive a first instruction message sent by a second base station, where the first instruction message is used to instruct the first base station 200 to change the transmission period and/or the transmission pattern of the downlink information.

The processor 2002 is specifically configured to: after determining that a preset condition is satisfied, determine to change the transmission period and/or the transmission pattern of the downlink information, where the preset condition includes that the processor 2002 detects that the measurement value of the uplink pilot sent by the UE is greater than the specified value, or that the receiver 2003 receives the proximity instruction message, the access sequence, or the scheduling request signal sent by the UE, or that the receiver 2003 receives the first instruction message sent by the second base station.

Preferably, in the first base station 200 provided in this embodiment of the present invention, the transmitter 2001 is further configured to: after sending the downlink information, after the UE accesses the first base station 200, send the downlink information at a preset time point by using the first period according to the first pattern, or send the downlink information by using the first period according to the first pattern after a preset time.

Preferably, in the first base station 200 provided in this embodiment of the present invention, the transmitter 2001 is further configured to: when the preset condition is that the receiver 2003 receives the first instruction message sent by the second base station, after sending the downlink information, send an identifier of the second period and/or an identifier of the second pattern to the second base station; or the receiver 2003 is further configured to: when the preset condition is that the receiver 2003 receives the first instruction message sent by the second base station, after sending the downlink information, receive a request message sent by the second base station, where the request message is used to request to obtain an identifier of the second period and/or an identifier of the second pattern; and the transmitter 2001 is further configured to send a request response message to the second base station, where the request response message carries the identifier of the second period and/or the identifier of the second pattern.

Optionally, in the first base station 200 provided in this embodiment of the present invention, the transmitter 2001 is further configured to: when the preset condition is that the processor 2002 detects that the measurement value of the uplink pilot sent by the UE is greater than the specified value, or that the receiver 2003 receives the proximity instruction message, the access sequence, or the scheduling request signal sent by the UE, after sending the downlink information, send a second instruction message to the UE, where the second instruction message is used to indicate that the period and/or the pattern used by the first base station 200 to send the downlink information have been changed.

Optionally, in the first base station 200 provided in this embodiment of the present invention, the second instruction message carries an identifier of the second period and/or an identifier of the second pattern.

Optionally, in the first base station 200 provided in this embodiment of the present invention, the transmitter 2001 is further configured to: after sending the downlink information, send the second instruction message to at least one first UE covered by the first base station 200.

Different from the prior art, by using the first base station provided in this embodiment of the present invention, the first base station does not send downlink information by using a fixed period or according to a fixed pattern, but sends downlink information by using relatively many time frequency resources when determining to change a transmission period and/or a transmission pattern of the downlink information (if UE is to use a resource of the first base station), so that the UE can receive the downlink information in time, and establish a wireless connection to the first base station rapidly according to the downlink information. Therefore, compared with the prior art, by means of the first base station provided in this embodiment of the present invention, it can be ensured that UE can obtain downlink information in time, and further can establish a wireless connection to a base station rapidly, thereby reducing a time for the UE to access a network, and further improving user experience.

Figure 22:
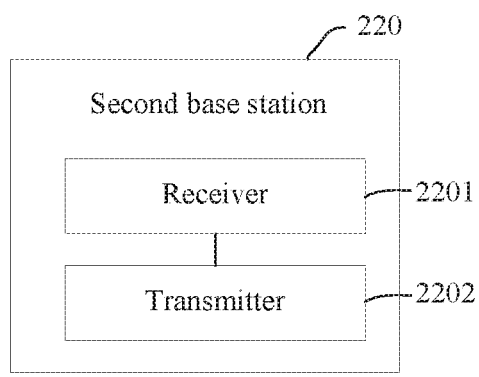
FIG. 22 is a schematic structural diagram of a second base station according to an embodiment of the present invention.

As shown in FIG. 22, another embodiment of the present invention provides a second base station 220, including a receiver 2201 and a transmitter 2202.

The receiver 2201 is configured to receive indication information sent by UE, where the indication information is used to indicate that the UE detects that a measurement value of a downlink pilot sent by a first base station is greater than a specified value.

The transmitter 2202 is configured to: after the receiver 2201 receives the indication information sent by the UE, send a first instruction message to the first base station, where the first instruction message is used to instruct the first base station to change a period and/or a pattern for sending downlink information.

The transmitter 2202 is further configured to send a second instruction message to the UE, where the second instruction message is used to indicate that the period and/or the pattern used by first base station to send the downlink information have been changed.

Specifically, the downlink information may include a downlink common signal and/or a part or all of downlink common information.

Figure 23:
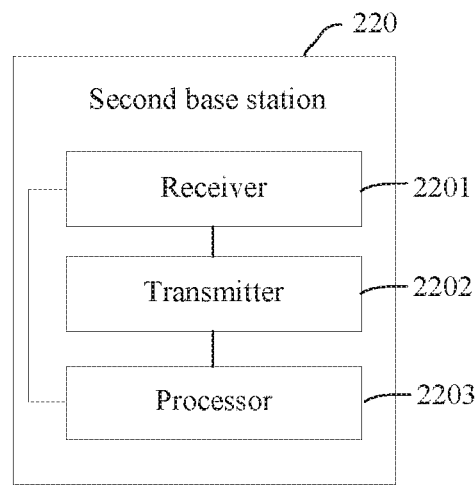
FIG. 23 is a schematic structural diagram of another second base station according to an embodiment of the present invention.

Further, as shown in FIG. 23, the second base station 220 provided in this embodiment of the present invention may further include a processor 2203.

The processor 2203 is configured to: after the transmitter 2202 sends the first instruction message to the first base station, before the transmitter 2202 sends the second instruction message to the UE, obtain an identifier of a second period and/or an identifier of a second pattern, where the second period is a transmission period obtained after the first base station changes the period for sending the downlink information, and the second pattern is a transmission pattern obtained after the first base station changes the pattern for sending the downlink information.

Preferably, in the second base station 220 provided in this embodiment of the present invention, the processor 2203 is specifically configured to: receive the identifier of the second period and/or the identifier of the second pattern that are sent by the first base station; or send a request message to the first base station, where the request message is used to request to obtain the identifier of the second period and/or the identifier of the second pattern; and receive a request response message sent by the first base station, and obtain the identifier of the second period and/or the identifier of the second pattern according to the request response message, where the request response message carries the identifier of the second period and/or the identifier of the second pattern.

Preferably, in the second base station 220 provided in this embodiment of the present invention, the transmitter 2202 is further configured to: after sending the first instruction message to the first base station, send the second instruction message to at least one first UE covered by the first base station.

In this embodiment of the present invention, after receiving indication information sent by UE, the second base station sends a first instruction message to a first base station, to instruct the first base station to change a period and/or a pattern for sending downlink information. In this way, after receiving the instruction message sent by the second base station, the first base station may determine that the transmission period and/or the transmission pattern of the downlink information need to be changed, further change the transmission period and/or the transmission pattern of the downlink information, and send the downlink information by using relatively many time frequency resources, so that the UE can receive the downlink information in time and establish a wireless connection to the first base station rapidly according to the downlink information. Therefore, compared with the prior art, by means of the second base station provided in this embodiment of the present invention, it can be ensured that UE can obtain downlink information in time, and further can establish a wireless connection to a first base station rapidly, thereby reducing a time for the UE to access a network, and further improving user experience.

Figure 24:
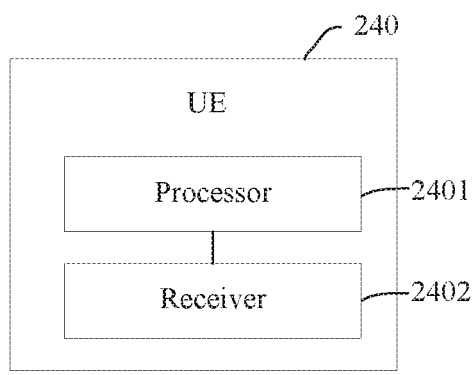
FIG. 24 is a schematic structural diagram of UE according to an embodiment of the present invention.

As shown in FIG. 24, another embodiment of the present invention provides UE 240, including a processor 2401 and a receiver 2402.

The processor 2401 is configured to determine that a first base station has changed a period and/or a pattern for sending downlink information.

The processor 2401 is further configured to obtain a period and a pattern that are used by the first base station to send the downlink information.

The receiver 2402 is configured to receive, according to the period and the pattern, the downlink information sent by the first base station.

Specifically, the downlink information may include a downlink common signal and/or a part or all of downlink common information.

Preferably, in the UE 240 provided in this embodiment of the present invention, the processor 2401 is further configured to detect whether a measurement value of a downlink pilot sent by the first base station is greater than a specified value, whether fingerprint information obtained by the UE 240 matches pre-stored fingerprint information, and whether geographical location information of a current location of the UE 240 matches pre-stored geographical location information: the receiver 2402 is further configured to receive an instruction message sent by the first base station or a second base station, where the instruction message is used to indicate that the period and/or the pattern used by the first base station to send the downlink information have been changed; and the processor 2401 is specifically configured to: after determining that a preset condition is satisfied, determine that the first base station has changed the period and/or the pattern for sending the downlink information, where the preset condition includes that the processor 2401 detects that the measurement value of the downlink pilot sent by the first base station is greater than the specified value, or that the fingerprint information obtained by the UE 240 matches the pre-stored fingerprint information, or that the geographical location information of the current location of the UE 240 matches the pre-stored geographical location information, or that the receiver 2402 receives the instruction message sent by the first base station or the second base station.

Figure 25:
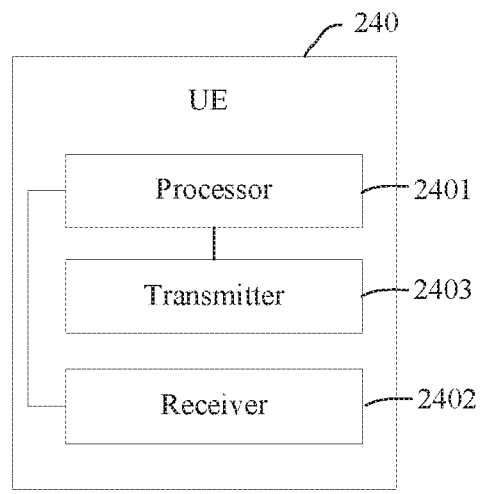
FIG. 25 is a schematic structural diagram of another UE according to an embodiment of the present invention.

Further, as shown in FIG. 25, the UE 240 provided in this embodiment of the present invention may further include a transmitter 2403.

The transmitter 2403 is configured to: when the preset condition is that the processor 2401 detects that the measurement value of the downlink pilot sent by the first base station is greater than the specified value, or that the fingerprint information obtained by the UE 240 matches the pre-stored fingerprint information, or that the geographical location information of the current location of the UE 240 matches the pre-stored geographical location information, after the processor 2401 determines that the preset condition is satisfied, send indication information to the first base station, where the indication information is used to indicate that the processor 2401 detects that the measurement value of the downlink pilot sent by the first base station is greater than the specified value, or the fingerprint information obtained by the UE 240 matches the pre-stored fingerprint information, or the geographical location information of the current location of the UE 240 matches the pre-stored geographical location information.

Preferably, in the UE 240 provided in this embodiment of the present invention, the processor 2401 is specifically configured to: when the preset condition is that it is detected that the measurement value of the downlink pilot sent by the first base station is greater than the specified value, or that the fingerprint information obtained by the UE 240 matches the pre-stored fingerprint information, or that the geographical location information of the current location of the UE 240 matches the pre-stored geographical location information, obtain, according to pre-stored configuration information, the period and the pattern that are used by the first base station to send the downlink information.

In a possible implementation, the processor 2401 is specifically configured to: when the preset condition is that the receiver 2402 receives the instruction message sent by the first base station or the second base station, determine that the instruction message carries only a second period, obtain the second period carried in the instruction message, and obtain a first pattern according to pre-stored configuration information, where the second period is a transmission period obtained after the first base station changes the period for sending the downlink information, and the first pattern is a transmission pattern obtained before the first base station changes the period for sending the downlink information; and the receiver 2402 is specifically configured to receive, according to the second period and the first pattern, the downlink information sent by the first base station.

In a possible implementation, the processor 2401 is specifically configured to: when the preset condition is that the receiver 2402 receives the instruction message sent by the first base station or the second base station, determine that the instruction message carries only an identifier of a second pattern, obtain the second pattern according to the identifier of the second pattern, and obtain a first period according to pre-stored configuration information, where the second pattern is a transmission pattern obtained after the first base station changes the pattern for sending the downlink information, and the first period is a transmission period obtained before the first base station changes the pattern for sending the downlink information; and the receiver 2402 is specifically configured to receive, according to the first period and the second pattern, the downlink information sent by the first base station.

In a possible implementation, the processor 2401 is specifically configured to: when the preset condition is that the receiver 2402 receives the instruction message sent by the first base station or the second base station, determine that the instruction message carries an identifier of a second period and an identifier of a second pattern, obtain the identifier of the second period and the identifier of the second pattern that are carried in the instruction message, and obtain the second pattern according to the identifier of the second pattern, where the first period is a transmission period obtained after the first base station changes the period for sending the downlink information, and the second pattern is a transmission pattern obtained after the first base station changes the pattern for sending the downlink information; and the receiver 2402 is specifically configured to receive, according to the second period and the second pattern, the downlink information sent by the first base station.

After determining that a first base station has changed a period and/or a pattern for sending downlink information, the UE provided in this embodiment of the present invention obtains a period and a pattern that are currently used by the first base station to send the downlink information, and receives, according to the period and the pattern, the downlink information sent by the first base station. Therefore, by using the UE provided in this embodiment of the present invention, a base station does not send downlink information by using a fixed period or according to a fixed pattern (even though the base station sends the downlink information by using a fixed time frequency resource), but changes a period and/or a pattern for sending the downlink information, to send the downlink information by using relatively many time frequency resources. In this way, after determining that the base station has changed the period and/or the pattern for sending the downlink information, the UE can receive the downlink information in time, and establish a wireless connection to the base station rapidly according to the downlink information. Therefore, compared with the prior art, by means of the UE provided in this embodiment of the present invention, it can be ensured that the UE can obtain downlink information in time, and further can establish a wireless connection to a base station rapidly, thereby reducing a time for the UE to access a network, and further improving user experience.

It may be clearly understood by a person skilled in the art that, for the purpose of convenient and brief description, for the apparatus described above, division of the foregoing function modules is merely used as an example for illustration. In actual application, the foregoing functions can be allocated to different modules and implemented according to a requirement, that is, an inner structure of an apparatus is divided into different function modules to implement all or part of the functions described above. For a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. By using such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method of downlink transmission, comprising:
   receiving, by a user equipment, a first synchronization signal and a first system broadcast message from a first network device according to a first transmission period and a first transmission pattern in a time and frequency domain;
   sending, by the user equipment, an uplink pilot to the first network device;
   receiving, by the user equipment, indication information indicating a second transmission period and a second transmission pattern in a time and frequency domain based on a measurement value of the uplink pilot being greater than a specified value, wherein the second transmission period and the second transmission pattern are usable for transmission of a second synchronization signal and a second system broadcast message from the first network device to the user equipment, and the second transmission period is smaller than the first transmission period;
   determining, by the user equipment, the second transmission period and the second transmission pattern according to the indication information; and
   receiving, by the user equipment, from the first network device, the second synchronization signal and the second system broadcast message according to the second transmission period and the second transmission pattern.

2. An apparatus for receiving downlink information, comprising:
   a receiver configured to receive a first synchronization signal and a first system broadcast message from a first network device according to a first transmission period and a first transmission pattern in a time and frequency domain; and
   a transmitter configured to send an uplink pilot to the first network device;
   wherein the receiver is further configured to receive indication information indicating a second transmission period and a second transmission pattern in a time and frequency domain based on a measurement value of the uplink pilot being greater than a specified value, wherein the second transmission period and the second transmission pattern are usable for transmission of a second synchronization signal and a second system broadcast message from the first network device to the apparatus, and the second transmission period is smaller than the first transmission period;

wherein the apparatus further comprises a processor configured to determine the second transmission period and the second transmission pattern according to the indication information;

wherein the receiver is further configured to receive, from the first network device, the second synchronization signal and the second system broadcast message according to the second transmission period and the second transmission pattern.

3. An apparatus for transmitting downlink information, comprising:

a transmitter configured to transmit a first synchronization signal and a first system broadcast message to a user equipment according to a first transmission period and a first transmission pattern in a time and frequency domain; and a receiver configured to receive an uplink pilot from the user equipment;

wherein the transmitter is further configured to:

transmit indication information to the user equipment based on a measurement value of the uplink pilot being greater than a specified value, wherein the indication information indicates a second transmission period and a second transmission pattern in a time and frequency domain, wherein the second transmission period and the second transmission pattern are usable for transmitting a second synchronization signal and a second system broadcast message from the apparatus to the user equipment, and the second transmission period is smaller than the first transmission period; and transmit the second synchronization signal and the second system broadcast message to the user equipment according to the second transmission period and the second transmission pattern.

* * * * *